(12) United States Patent
Keller, III et al.

(10) Patent No.: US 9,851,386 B2
(45) Date of Patent: Dec. 26, 2017

(54) METHOD AND APPARATUS FOR DETECTION AND IDENTIFICATION OF COUNTERFEIT AND SUBSTANDARD ELECTRONICS

(71) Applicants: Walter John Keller, III, Bridgeville, PA (US); Andrew Richard Portune, Oakdale, PA (US); Todd Eric Chornenky, Carmichaels, PA (US); William Anthony Davis, Perrysburg, OH (US)

(72) Inventors: Walter John Keller, III, Bridgeville, PA (US); Andrew Richard Portune, Oakdale, PA (US); Todd Eric Chornenky, Carmichaels, PA (US); William Anthony Davis, Perrysburg, OH (US)

(73) Assignee: NOKOMIS, INC., Charleroi, PA (US)

( * ) Notice: Subject to any disclaimer, the term of this patent is extended or adjusted under 35 U.S.C. 154(b) by 717 days.

(21) Appl. No.: 14/199,687

(22) Filed: Mar. 6, 2014

(65) Prior Publication Data

US 2015/0137830 A1    May 21, 2015

Related U.S. Application Data

(60) Provisional application No. 61/851,323, filed on Mar. 6, 2013.

(51) Int. Cl.
*G01R 31/02* (2006.01)
*H01L 27/14* (2006.01)
(Continued)

(52) U.S. Cl.
CPC ........... *G01R 31/002* (2013.01); *G06F 21/73* (2013.01); *H01L 2924/0002* (2013.01)

(58) Field of Classification Search
CPC  G01R 31/002; G06F 21/73; H01L 2924/0002
(Continued)

(56) References Cited

U.S. PATENT DOCUMENTS

| 5,218,294 A | 6/1993 | Soiferman |
| 5,227,800 A | 7/1993 | Huguenin et al. |

(Continued)

FOREIGN PATENT DOCUMENTS

| JP | 06011530 | 1/1994 |
| JP | 2000076387 | 3/2000 |

(Continued)

OTHER PUBLICATIONS

Y.P. Zhang, Duixian Liu, Antenna-on-chip and Antenna-in-Package Solutions to Highly Integrated Millimeter-Wave Devices for Wireless Communication, 2009, vol. 57 No. 10.

(Continued)

*Primary Examiner* — Farhana Hoque
(74) *Attorney, Agent, or Firm* — James Ray and Assocs

(57) ABSTRACT

An apparatus for detecting a condition or authenticity of one or more electronic devices includes an enclosure having an antenna integrated therewithin, a fixture mounted within a hollow interior of the enclosure, the fixture being configured to receive the one or more electronic devices and connect one or more signals to each of the one or more electronic devices and a sensor and controller assembly connected to the antenna and configured to process a signature of an emission of a radiofrequency (RF) energy from of one or more electronic devices having the one or more signals connected thereto.

28 Claims, 17 Drawing Sheets

(51) Int. Cl.
  *G01R 31/00* (2006.01)
  *G06F 21/73* (2013.01)
(58) Field of Classification Search
  USPC .................................. 324/537, 629; 257/428
  See application file for complete search history.

(56) References Cited

U.S. PATENT DOCUMENTS

| | | | |
|---|---|---|---|
| 5,302,830 | A | 4/1994 | Shivanandan |
| 5,424,633 | A | 6/1995 | Soiferman |
| 5,517,110 | A | 5/1996 | Soiferman |
| 5,668,342 | A | 9/1997 | Discher |
| 5,714,888 | A | 2/1998 | Naujoks |
| 6,049,301 | A | 4/2000 | Weagant |
| 6,057,765 | A | 5/2000 | Jones et al. |
| 6,163,259 | A | 12/2000 | Barsumian et al. |
| 6,496,703 | B1 | 12/2002 | da Silva |
| 6,720,905 | B2 | 4/2004 | Levitan et al. |
| 6,759,863 | B2 | 7/2004 | Moore |
| 6,765,527 | B2 | 7/2004 | Jablonski et al. |
| 6,825,456 | B2 | 11/2004 | Chadwick et al. |
| 6,897,777 | B2 | 5/2005 | Holmes et al. |
| 6,927,579 | B2 | 8/2005 | Blades |
| 6,985,771 | B2 | 1/2006 | Fischell et al. |
| 7,130,624 | B1 | 10/2006 | Jackson et al. |
| 7,138,936 | B2 | 11/2006 | Duff et al. |
| 7,188,037 | B2 | 3/2007 | Hidehira |
| 7,391,356 | B2 | 6/2008 | Brumley et al. |
| 7,512,511 | B1 | 3/2009 | Schultz et al. |
| 7,515,094 | B2 | 4/2009 | Keller, III |
| 7,609,199 | B2 | 10/2009 | Nishijima et al. |
| 7,639,178 | B1 | 12/2009 | Mulbrook et al. |
| 7,777,671 | B2 | 8/2010 | Schnitzer et al. |
| 7,777,672 | B2 | 8/2010 | Schnitzer et al. |
| 7,844,341 | B2 | 11/2010 | Von Arx et al. |
| 8,063,813 | B1 | 11/2011 | Keller |
| 2005/0265124 | A1 | 12/2005 | Smith |
| 2006/0152232 | A1 | 7/2006 | Shvets et al. |
| 2007/0027643 | A1 | 2/2007 | Lesesky et al. |
| 2007/0229270 | A1 | 10/2007 | Rofougaran |
| 2007/0234058 | A1 | 10/2007 | White |
| 2007/0279071 | A1 | 12/2007 | Orton |
| 2008/0103555 | A1 | 5/2008 | Dicks et al. |
| 2008/0284609 | A1 | 11/2008 | Rofougaran |
| 2009/0099830 | A1 | 4/2009 | Gross et al. |
| 2009/0218657 | A1 | 9/2009 | Rofougaran |
| 2010/0033386 | A1 | 2/2010 | Lewis et al. |
| 2010/0123453 | A1 | 5/2010 | Pauly et al. |
| 2010/0125438 | A1 | 5/2010 | Audet |
| 2010/0237854 | A1 | 9/2010 | Kumhyr et al. |
| 2010/0241864 | A1 | 9/2010 | Kelley et al. |
| 2010/0332199 | A1 | 12/2010 | Dhanekula et al. |
| 2011/0320170 | A1 | 12/2011 | Pathak et al. |
| 2012/0179812 | A1 | 7/2012 | Keller, III |
| 2012/0223403 | A1* | 9/2012 | Keller, III ............. H01L 23/576 257/428 |
| 2012/0226463 | A1 | 9/2012 | Keller, III |
| 2013/0082717 | A1 | 4/2013 | Kim et al. |

FOREIGN PATENT DOCUMENTS

| | | |
|---|---|---|
| JP | 2003503679 | 1/2003 |
| JP | 2011174709 | 9/2011 |
| JP | 2012026913 | 2/2012 |
| KR | 100946238 | 3/2010 |
| KR | 101077441 | 10/2011 |
| WO | 2009047585 | 4/2009 |

OTHER PUBLICATIONS

Walter J. Keller and Bogdan A. Pathak; Advanced Detection of Electronic Counterfeit; Apr. 19, 2013; Nokomis, Inc.
William E. Cobb, et al., Intrinsic Physical-Layer Authentication of Integrated Circuits, Lee Transactions on Information Forensics and Security, vol. 7., Feb. 1, 2012.
Ashwin Lakshminarasimhan, Electromagnetic Side-Channel Analysis for Hardware and Software Watermarking, Master of Science in Electrical and Computer Engineering; Sep. 2011.

* cited by examiner

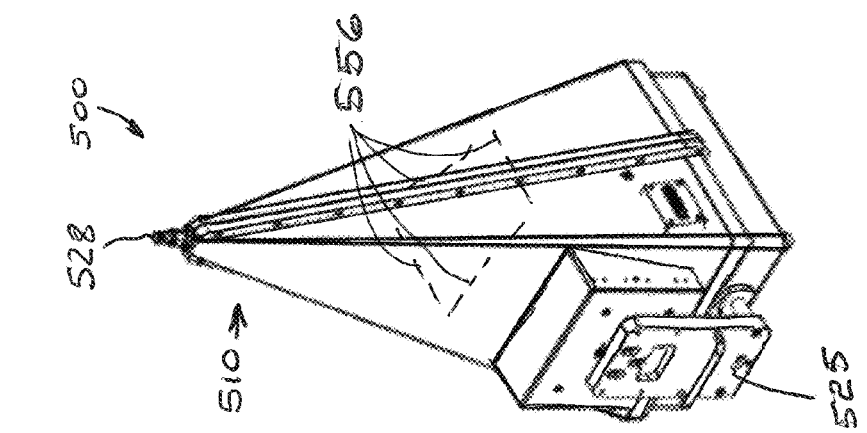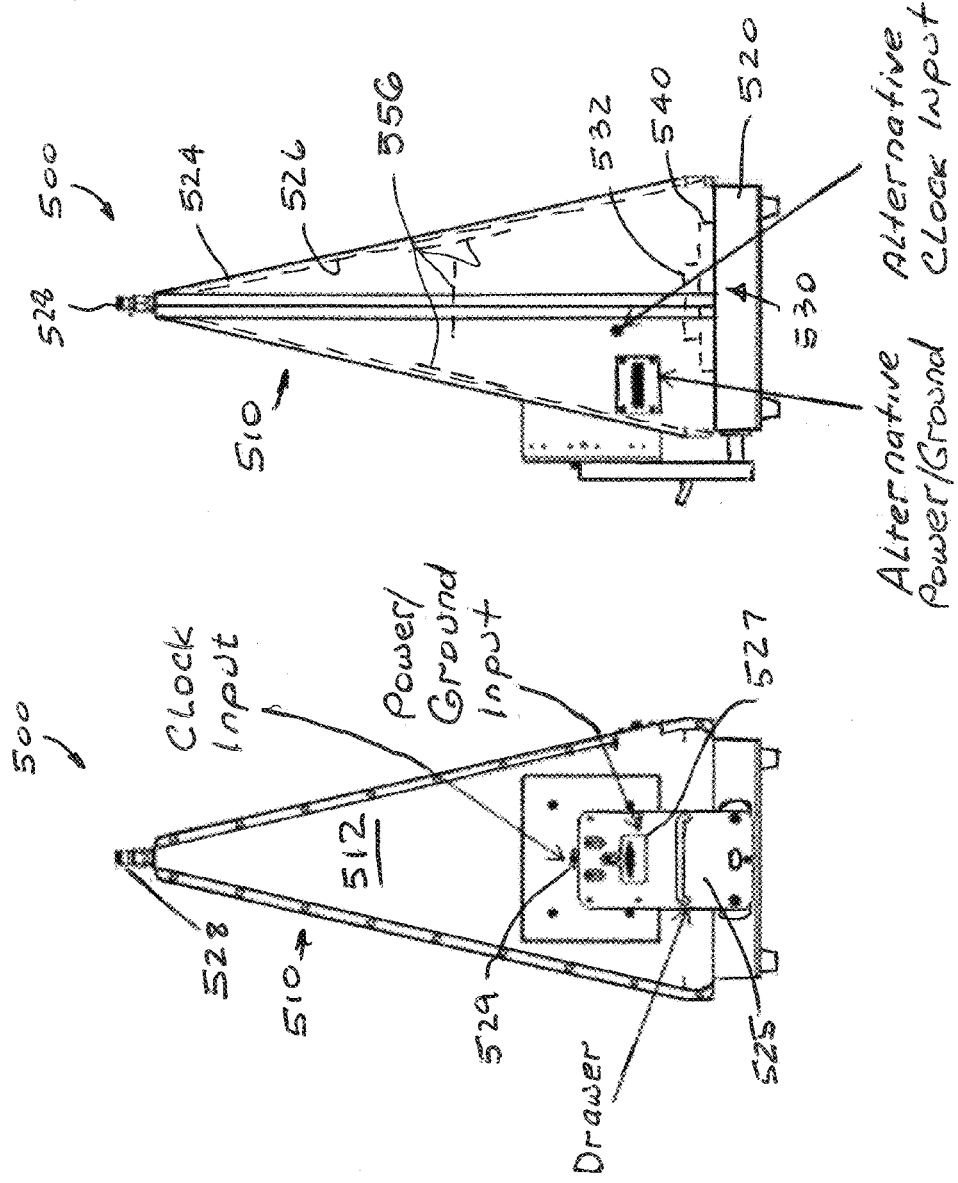

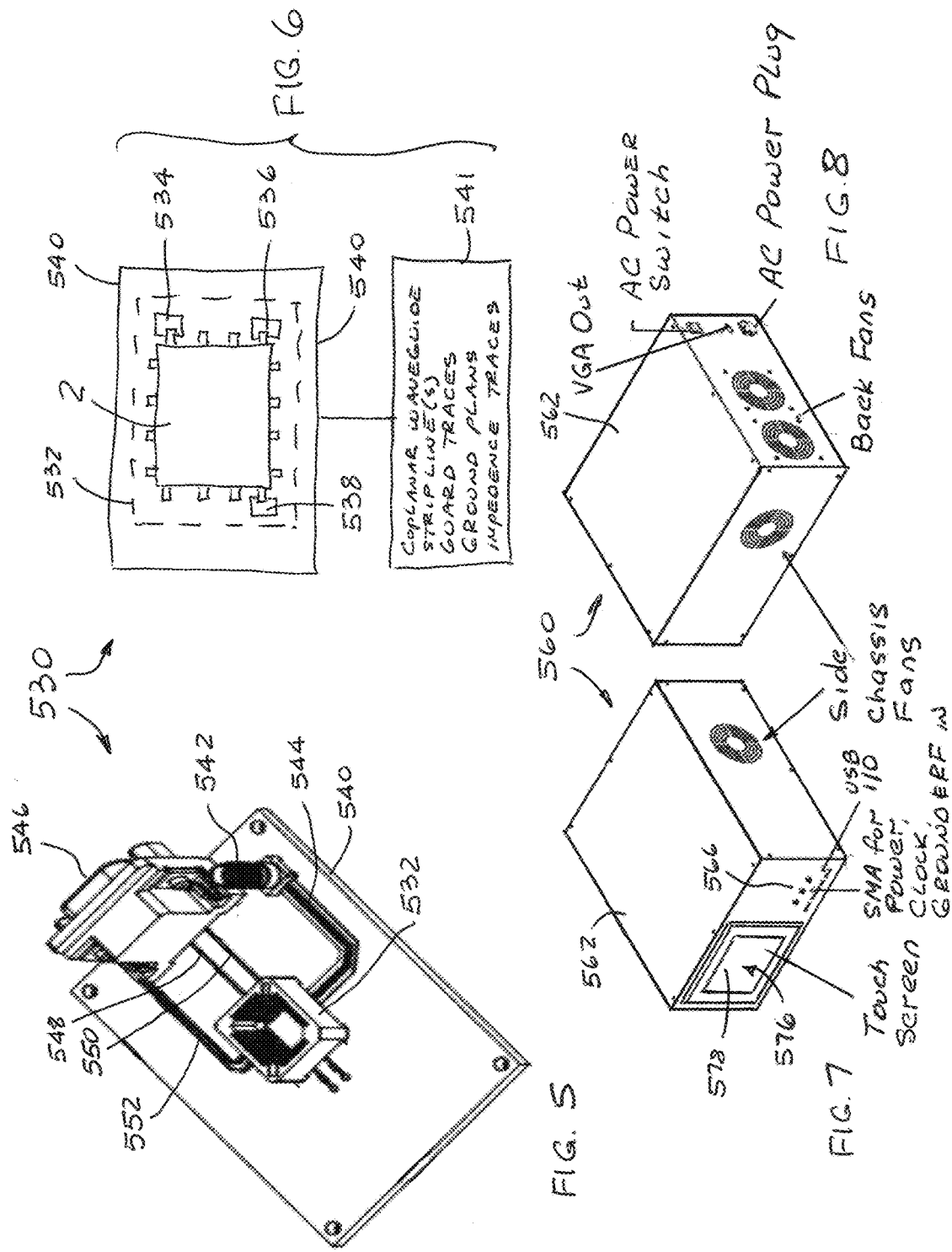

Typical Input Modulations

Typical Input Modulations for power

Typical Input Modulations for clock

METHOD AND APPARATUS FOR DETECTION AND IDENTIFICATION OF COUNTERFEIT AND SUBSTANDARD ELECTRONICS

CROSS-REFERENCE TO RELATED APPLICATIONS

This application is related to and claims priority from U.S. Provisional Patent Application Ser. No. 61/851,323 filed on Mar. 6, 2013. This application is closely related to U.S. Ser. No. 13/410,797 filed on Mar. 2, 2012, entitled "SYSTEM AND METHOD FOR PHYSICALLY DETECTING COUNTERFEIT ELECTRONICS", now published as US 2012-0226463 A1 and U.S. Ser. No. 13/410,909 filed on Mar. 2, 2012, entitled "INTEGRATED CIRCUIT WITH ELECTROMAGNETIC ENERGY ANOMALY DETECTION AND PROCESSING", now published as US 2012-0223403 A1. These applications are being assigned to the assignee of the present invention and the disclosures of these applications are hereby incorporated by reference thereto.

STATEMENT REGARDING FEDERALLY SPONSORED RESEARCH AND DEVELOPMENT

This invention was made with government support under Small Business Innovative Research (SBIR) Contract N00024-12-C-4516 titled "Advanced Detection of Electronic Counterfeits" and awarded by the United States Navy. The government has certain rights in the invention.

FIELD OF THE INVENTION

The present invention relates, in general, to a system and method for detecting counterfeit electronic devices using the intended or unintended emissions given off by the devices.

REFERENCE TO A SEQUENCE LISTING, A TABLE, OR A COMPUTER PROGRAM LISTING COMPACT DISC APPENDIX

N/A

BACKGROUND OF THE INVENTION

As is generally well known, counterfeit electronic devices, for example semiconductor components, are a wide-spread problem. When installed in a fully functional product, the counterfeited semiconductor components often malfunction, fail due to environmental conditions, age prematurely, have unwanted functionality and in some cases just don't function at all despite a close electrical match, thus affecting performance of devices and systems that use them and inflicting financial losses due to inadequate performance.

Counterfeit electronic devices can be found in many forms. One major feature linking most counterfeits is that the internal electronics function differently, even in some cases if only very slightly so, than a genuine or authentic part straight off the manufacturing line. If the internal parts of the counterfeit electronics, whether it be a discrete semiconductor, integrated circuit, printed circuit board, circuit board assembly or product are functioning or physically or materially configured differently than authentic electronics the part will give off a different electromagnetic signature.

Prior to the conception and design of the instant invention, efforts have been made to inspect and screen counterfeited electronic components. Many of them are either superficial, extremely expensive or both superficial and extremely expensive. Of superficial techniques, the simplest and most common is visual inspection, but as counterfeits have become increasingly sophisticated these techniques have become less reliable. In contrast, more reliable techniques that can detect some counterfeiting modalities that are in existence are expensive or are destructive in nature.

The different types of inspection techniques under which counterfeit electronic devices can be discovered include: visual external inspection for signs of resurfacing, solvent tests, visual microscopic inspection of encapsulant finish and lead surfaces, and x-ray inspection. During x-ray inspection the internal structure of like date and lot codes of electronic components are examined and compared to known authentic parts and certain types of counterfeit parts can be discovered, but these techniques are limited to physical external differences in the die, wirebonding etc. The less sophisticated counterfeit electronic devices exhibit vast differences in internal structure including, but not limited to, different die frames and different wire bonding. X-ray fluorescence spectroscopy can also be used to confirm component status which is sometimes overlooked by counterfeiters. Decapsulation, which involves the removing of the external packaging from a semiconductor die and exposing the semiconductor wafer or die for microscopic inspection of brand marks, trademarks, laser die etchings, date codes and other defining characteristics can be used to attempt to determine the authenticity of some electronic devices. Again, these techniques focus on the physical characteristics of the material that can be inspected when de-encapsulated and does not provide information regarding the underlying electronic functionality. These techniques are also destructive in nature. Chemical etching techniques which use acid to expose a wafer or die packaged in plastics or resins can likewise expose the internal components for inspection, but are destructive in nature.

Mechanical techniques including sanding, cutting, cracking, or chipping the ceramic or metal to expose wafer or die for inspection are also used with some success, but again result in destruction of the part being inspected. Scanning Acoustic Microscopy can be used to discover evidence of resurfacing and blacktopping by revealing laser etching below blacktop material.

Internal part layout tracing and external packaging curve tracing are other options to determine if the product has the anticipated electrical characteristics.

Electrical tests range from full electrical tests, which are typically expensive, to gross leak and fine lead functional electrical testing.

Applicant's own efforts described in U.S. Ser. No. 13/410,797 filed on Mar. 2, 2012, entitled "SYSTEM AND METHOD FOR PHYSICALLY DETECTING COUNTERFEIT ELECTRONICS", now published as US 2012-0226463 A1 and U.S. Ser. No. 13/410,909 filed on Mar. 2, 2012, entitled "INTEGRATED CIRCUIT WITH ELECTROMAGNETIC ENERGY ANOMALY DETECTION AND PROCESSING", now published as US 2012-0223403 A1 improves inspection and screening of counterfeited electronic components However, it has been determined that there is a need for a further improved apparatus which not only more efficiently utilizes space in a repetitive testing environment, but offers enhanced RF signal emission gathering capability, space efficient RF shielding for external noise suppression, while improving counterfeit detection capability by modifying input signals to inspect and screen counterfeit electronic devices in a non-destructive manner by utilizing a signature of the radio frequency (RF) energy emitted by such electronic devices.

One challenge is the need to collect emissions content on the part in a manner that shields the measurement from the external environment. To the best knowledge of the Applicant, a means does not currently exist that specifically measures counterfeit part characteristics in an environment that simultaneously minimizes volume, provides favorable RF collection capability and provides shielding from undesirable environmental emissions.

SUMMARY OF THE INVENTION

The invention provides an apparatus for the detection of counterfeit electronic devices and the determination of authenticity for authentic electronic devices using the intended or unintended emissions given off by the devices. The invention uses an integrated antenna enclosure configured to RF shield the electronic devices under test, contain the electronic devices, provide specific selected inputs to the devices that may or may not typically include specific waveforms or patterns, gather resulting electromagnetic energy from the devices, and process the electromagnetic energy.

OBJECTS OF THE INVENTION

It is, therefore, one of the objects of the present invention to provide an apparatus for detection and/or identification of counterfeit and/or substandard electronic devices.

Another object of the invention is to provide an apparatus for determining the authenticity of individual parts prior to those parts being integrated onto a circuit board.

Another object of the present invention is to provide an apparatus for detection and/or identification of counterfeit and/or substandard electronic devices that includes an integrated antenna enclosure, wherein the electronic devices are mounted within a hollow interior of the integrated antenna enclosure.

Another object of the present invention is to provide an apparatus for detection and/or identification of counterfeit and/or substandard electronic devices that includes an integrated antenna enclosure, wherein the electronic devices are mounted within a hollow interior of the integrated antenna enclosure, wherein the structure of the integrated antenna enclosure provides both shielding from the external environment and simultaneously acts as an antenna to collect the unintended emissions energy from the part under test.

Yet another object of the present invention is to provide an apparatus for detection and/or identification of counterfeit and/or substandard electronic devices that energizes only power, clock and ground pins of such electronic devices.

A further object of the present invention is to provide an apparatus for detection and/or identification of counterfeit and/or substandard electronic devices that modulates at least one of power, clock and ground pins of such electronic devices.

Another object of the present invention is to provide an apparatus for detection and/or identification of counterfeit and/or substandard electronic devices that modulates signal applied to inputs not typically receiving a modulated signal of the modulation form expected by the manufacturer of such electronic devices.

A further object of the invention is to provide the modulation in a manner that does not impact the functionality of the device and does not exceed the typical expected electromagnetic interference noise that electronic devices being tested are typically designed to function with in normal standard operating conditions.

Another object of the invention is that the invention does not degrade the parts being tested.

A further object of the present invention is to provide an apparatus for detection and/or identification of counterfeit and/or substandard electronic devices that modulates only connections to the power pins of electronic devices.

A further object of the present invention is to provide an apparatus for detection and/or identification of counterfeit and/or substandard electronic devices that modulates power of electronic devices, wherein the modulation of the power pin, which connects to every circuit in the device provides a means to stimulate with the modulation every circuit in a part.

Another object of the present invention is to provide an apparatus for detection and/or identification of counterfeit and/or substandard electronic devices that provides low-level modulation of the power of an electronic device, wherein the modulation of the power pin, which connects to every circuit in the device provides a means to stimulate every circuit in a part to provide signature characteristics of any sub-circuit in the part to indentify anomalies that indicate the part is not authentic.

A further object of the present invention is to provide an apparatus for detection and/or identification of counterfeit and/or substandard electronic devices that provides low-level modulation of the power of an electronic device, wherein the modulation of any pin, provides a means to stimulate circuits in a part to provide signature characteristics of sub-circuits in the part to indentify anomalies that indicate the part is not authentic or that the part has changed form an expected state.

Another object of the present invention is to provide an apparatus for detection and/or identification of counterfeit and/or substandard electronic devices that have been modified intentionally by the counterfeiter.

A further object of the present invention is to provide an apparatus for detection and/or identification of counterfeit and/or substandard electronic devices that have been modified intentionally by the counterfeiter with the intent of changing functionality within the part.

Another object of the invention is detecting counterfeit microcontroller, microprocessor, Field Programmable Gate Array (FPGA), Digital Signal Processor (DSP) and memory parts.

A further object of the invention is to benefit from the additional emissions presented by the part using only a small number of inputs, which provide distinct advantages for screening of a large number of parts in a manufacturing facility.

Yet a further object of the present invention is to provide an apparatus for detection and/or identification of counterfeit and/or substandard electronic devices that shield the electronic devices under test from environmental emissions of electromagnetic energy.

An additional object of the present invention is to provide an apparatus for detection and/or identification of counterfeit and/or substandard electronic devices that includes an integrated antenna enclosure, wherein the electronic devices are mounted within a hollow interior of the integrated antenna enclosure and a sensor coupled to the antenna and configured to process a signature of each emission captured by the antenna.

A further object of the present invention is to provide a method for detection and/or identification of counterfeit and/or substandard electronic devices, utilizing the above described apparatus.

Another object of the present invention is to provide a method for quality control of electronic devices, utilizing the above described apparatus.

Yet another object of the present invention is to provide an integrated antenna enclosure used to keep out any environmental noise from interfering with the measurement.

A further object of the invention is to provide an integrated antenna enclosure that captures RF energy, defined as the frequency range from 10 KHz to 300 GHZ, for the measurements that the counterfeit or anomaly detection apparatus detects.

Another object of the invention is to provide an integrated antenna enclosure that provides a means to power the part, to ground the part, to send clocks to the part and to send any other inputs/outputs needed by the part.

Yet another object of the invention is to provide an integrated antenna enclosure that provides a means for housing a test fixture that contains the part.

A further object of the invention is to provide an integrated antenna enclosure that provides a means for registering the location of the part so that there is reproducibility of measurements.

Another object of the invention is to provide an integrated antenna enclosure that provides a means for providing modulations onto the power, ground, clock or any other input or output from the part to enhance the signatures from the part.

A further object of the invention is to provide a modulation mechanism that can be chosen specifically to enhance the differentiation between a counterfeit part and an authentic part.

Another object of the invention is to provide a modulation mechanism to include controls can be resident as part of the integrated antenna enclosure or can be part of the measurement system that measures and compares the signatures between parts to determine if a part is counterfeit or if there are any other anomalies that would infer a bad part for quality control activities.

A further object of the invention is to provide a means by which the counterfeit measurement is generalized.

Another object of the invention is to provide a means for detection of counterfeit parts using a wideband received emission collection and processor with automated detection algorithms for real time detection of anomalies and counterfeits.

A further object of the invention is to provide the sensor and integrated antenna enclosure that are configured into a single housing that is highly integrated that removes the need for interface connectors between the sensor assembly and the integrated antenna enclosure assembly.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 2 is a front elevation view of an integrated antenna enclosure employed within an apparatus of FIG. 1;

FIG. 3 is a side elevation view of the integrated antenna enclosure of FIG. 2;

FIG. 4 is a 3-d view of the integrated antenna enclosure of FIGS. 2-3;

FIG. 5 is a 3-d view of a fixture employed within the integrated antenna enclosure of FIGS. 2-3;

FIG. 6 is a block diagram of the fixture of FIG. 5, particularly showing connections to pins of the electronic device;

FIG. 7 is a front 3-d view of a sensor and controlled assembly employed within the apparatus of FIG. 1;

FIG. 8 is a rear view of the sensor and controller assembly device of FIG. 7;

BRIEF DESCRIPTION OF THE VARIOUS EMBODIMENTS OF THE INVENTION

Figure 1:
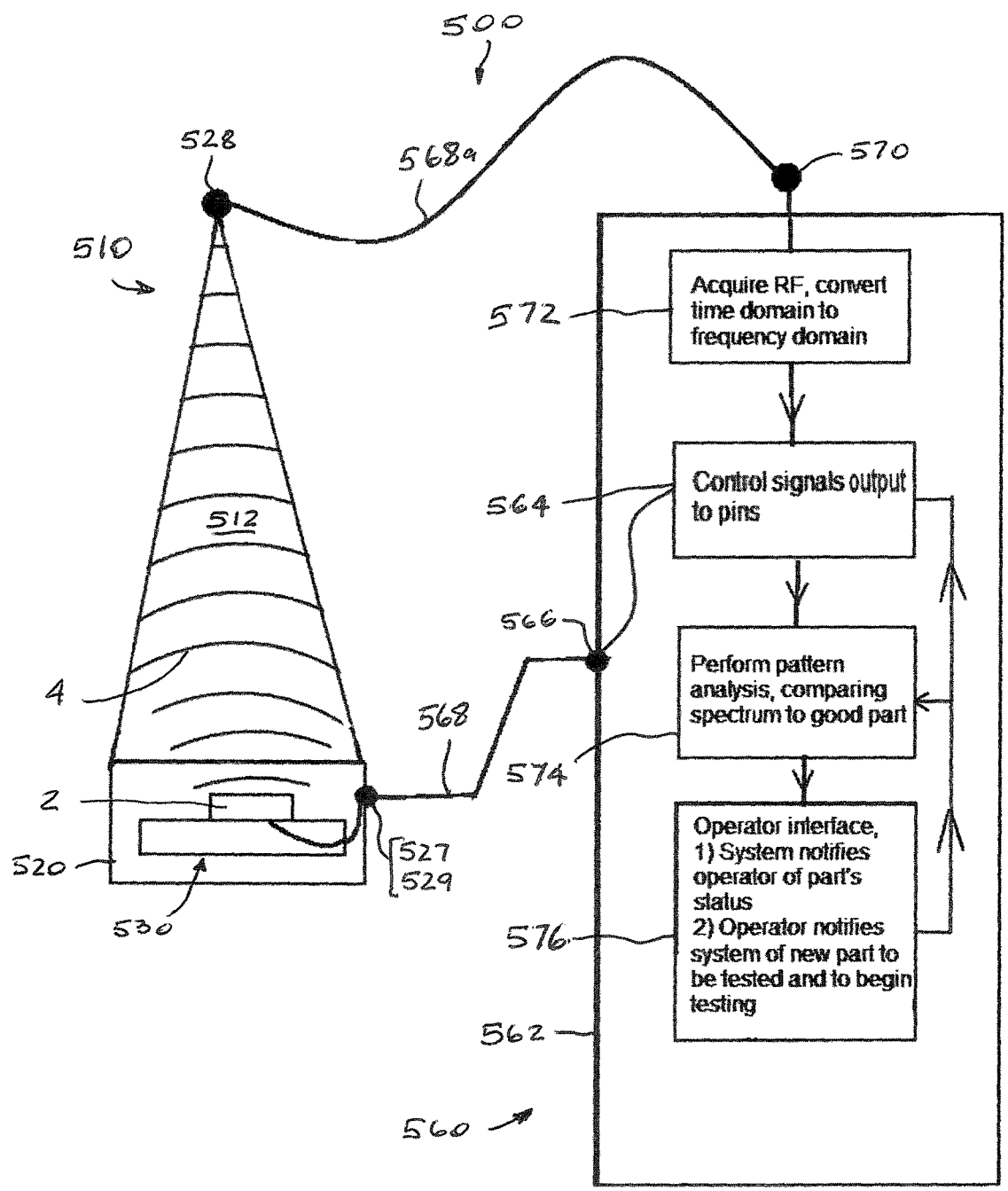
FIG. 1 is a block diagram of an apparatus of the instant invention for detection and/or identification of counterfeit and/or substandard electronic devices.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a counterfeit or substandard electronic device applies to but is not limited to work-alike electronic device, used electronic devices which have been removed from existing assemblies and sold as new and genuine parts, electronic devices which have been remarked to misrepresent their model/part number, manufacturer, cage code, date and/or lot code, reliability level, inspection, level of testing, or performance specification, electronic devices which do not conform to Original Component Manufacturer design, model, and/or performance standards, electronic devices which have been deliberately or unintentionally modified, electronic devices which have been deliberately modified to pose a security threat, and electronic devices which have been deliberately and/or intentionally modified for a malicious purpose with the intent to deceive as to the intended function.

These counterfeit or substandard electronic device definitions extend to all electronic devices to include, but not limited to, active and passive circuit board parts, semiconductor devices and integrated circuits. Identical definitions apply to a counterfeit device, board, circuit board, circuit board assembly, assemblies, subsystems, systems or products.

The best mode for carrying out the invention is presented in terms of its presently preferred embodiment, herein depicted within FIGS. 1 through 16. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The present invention is illustrated and described in combination with an electronic device 2 of a semiconductor type, for example such as an integrated circuit (IC), although it will be apparent to those skilled in the relevant art that the present invention may be applied to other type of electronic devices and as such should not be interpreted as a limiting factor of the integrated circuit, part or even assessment of full circuit boards using the present invention.

The signature of the electromagnetic emission given off is a fundamental property of any electronic device. At the most basic level, accelerating electrons give off electromagnetic energy creating an electromagnetic signature. Since the application of power and oscillating inputs will, by definition, accelerate electrons within the electronic device 2 being screened for counterfeits and therefore give off electromagnetic energy, a fundamental characteristic of the screening and inspection enhancements practiced by this invention will apply to all modern electronics. The power described can be external commercial power, battery power or internal power generation mechanisms.

Reference is now made, to FIGS. 1-19, wherein there is shown an apparatus, generally designated as 500, for detection and/or identification of counterfeit and/or substandard electronic devices 2.

Now in a particular reference to FIG. 1, the apparatus 500 comprises of two essential devices, integrated antenna enclosure, generally designated as 510, and sensor and controller assembly, generally designated as 560, that is operatively coupled to the integrated antenna enclosure 510 to source required signals to the electronic device 2 under test and receive and process intended and/or unintended emissions 4 of an electromagnetic energy from the electronic device 2 captured by the integrated antenna enclosure 510, preferably in a radiofrequency (RF) range from about 10 kilohertz (KHz) to about 300 gigahertz (GHZ).

In the presently preferred embodiment shown in FIG. 1, the interior structure of the integrated antenna enclosure 510 itself is configured and constructed to act as the antenna means to collect the electromagnetic energy without the need for additionally mounted auxiliary antenna elements.

Now in a particular reference to FIGS. 2-4, the integrated antenna enclosure 510 includes a base 520 and a peripheral wall 524 upstanding on the base 520 and having, in a presently preferred embodiment, a pyramid shape. The peripheral wall 524 defines, in a combination with the base 520, a hollow interior 512 of the enclosure 510. A drawer 525 is provided and is mounted for a movement, in a generally horizontal plane during use of the integrated enclosure 510, to selectively allow access into the hollow interior 512. A power/ground input connection 527 and a clock input connection 529 are provided on the wall 524 and, more particularly on the exterior surface of the drawer 525, by way of conventional connectors. An external fitting 528 at a apex of the peripheral wall 524 provides a connection so as to output the collected RF emission given off by the device 2.

The integrated antenna enclosure 510 further houses a fixture 530 mounted within the hollow interior 512, for example on an interior portion of the drawer 525. The fixture 530 is configured to receive one or more electronic devices 2 therewithin. In the presently preferred embodiment of the invention, the electronic device 2 is a semiconductor device, for example such as an integrated circuit (IC). Accordingly, the fixture 530 defines a socket 532, configured for insertion of the electronic device 2 thereinto. It would be understood that the socket 532 is configured (sized and shaped) to receive a specific electronic device 2. In one form, the presently preferred embodiment is concerned with only three pin connections between the socket 532 and the selectively distinct pins of the electronic device 2: power 534, clock 536 and ground 538. As best shown in FIG. 5, the fixture 530 may also include a circuit board 540 having the socket 532 mounted thereonto. The circuit board 540 provides means for generating input and/or an output signal to the electronic device 2. In this form, the circuit board 540 has circuits connecting each of the pin connections 534, 536 and 538 to a sourcing signal as it will be explained further in this document. In other words, the fixture 530 of the presently preferred embodiment is configured to apply, by way of these three pin connections 534, 536 and 538, at least one and preferably three and only three signals to three pins on each of the one or more electronic devices 2 received within the fixture 530, wherein each of the three and only three signals is applied to a selectively distinct pin. It would be understood that multiple sockets 532 will be provided when the multiple electronic devices 2 are to be tested at the same time in a batch testing mode.

Preferably, the fixture 530 is mounted in the center of the integrated antenna enclosure 510 or another preferred location based on the characteristics of the integrated antenna enclosure 510 so as to enhance collection of RF emission from the one or more electronic devices 2. As was described above, the access to the fixture 530 and, more particularly, to the socket 532 is achieved by way of a movable drawer 525.

The board 540 may be employed to house devices sourcing such at least one and preferably three and only three signals. In a further reference to FIG. 5, a clock input connector 542 is mounted on the board 540 and has a clock connection 544 with the socket 532. There is also a connector 546 that has power connection 548 and ground connection 550 with the socket 532. There may be also another connection 552 between the socket 532 and the connector 546.

The invention minimizes unwanted emissions within the integrated antenna enclosure 510 while enhancing the emissions that are emanated from the one or more electronic devices 2 being tested. Traces 541 on the test fixture 530 to include, but not limited to the clock utilize a coplanar waveguide trace design to facilitate the strict control of the electrical impedance and termination of the trace between the device and clock generation means allowing for a single impedance level to be maintained from the clock source to the device under test emplaced on the test fixture. Fixture trace designs and/or arrangements further provide ground shielding and guard shielding above, below and adjacent to the trace, stripline, buried stripline and microstrip features necessary to suppress the electromagnetic emissions generated by clock, I/O or modulation signal traces. These features assure the promotion of only the emissions from the one or more electronic devices 2 being tested in the integrated antenna enclosure 510 and not from the connections to the one or more electronic devices 2.

Thus, in one form, the apparatus 500 comprises the fixture 530 that includes at least one of a coplanar waveguide, stripline, buried stripline, guard traces, ground plans and controlled impedance trace design features and is configured thereby to promote electromagnetic emissions from the one or more electronic devices 2 under test while suppressing emissions from connections to the one or more electronic devices 2. The invention contemplates that the selectively distinct pin is one of an input to and an output from the each of the one or more electronic devices 2.

Applicant found that the clock, power and ground are routed to virtually all parts of a chip in a modern electronic devices such as a microcontroller, microprocessor, Field Programmable Gate Array (FPGA), Digital Signal Processor (DSP), Complex Programmable Logic Device (CPLD), Analog to Digital Converter (ADC), Digital to Analog Converter (DAC), DC-DC converter, AC-AC converter, Integrated Circuits (IC) and memory and the use of the above three pins of the electronic device 2 adequately exercises the basic functionality to determine authenticity of the electronic device 2 without the need for full instrumentation.

Applicant further found that the subsequent utilization thereof by way of an electrical signal that modulates or applies another waveform to one or all of these pins provides a means to enhance the signature of the electromagnetic energy emission from the internal circuitry of the one or more electronic devices 2, thereby providing an improved means of counterfeit electronics detection and general quality control. Essentially, modulation of a signal amplifies and changes parameters of the emission signature from the electronic device 2 and further amplifies the differences or changes of the actual emission signature from an expected emission signature.

The use of such small number of inputs and/or outputs provides distinct advantages during screening, inspection or quality control of a large number of electronic devices 2, for example in a manufacturing facility prior to installing such electronic devices 2 into their respective assemblies, particularly in view that some electronic devices 2 have hundreds of pins.

In other form, the invention contemplates use of additional pins of the electronic devices 2 to enhance additional characteristics of the electronic devices 2 under detection and/or identification from emissions resulting from activation of such additional pins and provides additional signal connections as described further in this document.

In yet additional form, the invention contemplates use of only one of the above described power 548, ground 550 and clock 544 connections.

The apparatus 500, in one embodiment, includes at least one and preferably an array of antenna elements 556 that are conformal to or integrated into interior surfaces 526 of the peripheral wall 524 or that are fully integral to the thickness thereof. The antenna element 556 may be provided in any of the conventional antenna forms/constructions.

The combination of the peripheral wall 524 and the antenna elements 556 is configured to provide an integrated antenna enclosure 510 that shields the hollow interior 512 from effects of environmental emissions of electromagnetic energy while allowing antenna elements 556 to collect the emissions RF energy 4 from the one or more electronic devices 2.

It is important to note that the most volumetric efficient configuration is one that uses the physical structure of the antenna to be used as the shielding mechanism to prevent electromagnetic energy from outside the integrated antenna enclosure from entering the interior of the integrated antenna enclosure 510. The presently preferred embodiment uses an integrated antenna enclosure 510 that intimately integrates the antenna 556 and the shielding features of the enclosure. FIG. 4 shows a tapered pyramidal shape as one of the preferred embodiments. In the presently preferred embodiment, the one or more antenna elements 556 are fully integrated into the structure. In one presently preferred embodiment, at least one of conductive, semi-conductive, insulative and electromagnetic absorptive materials are utilized at appropriate locations within the integrated antenna enclosure 510 to tune the integrated antenna enclosure 510.

The symmetrical 4-sided pyramid shape of FIGS. 2-4, provides a means to capture the maximum amount of RF signal while also creating a completely enclosed space shielding out external noise.

Figure 9:
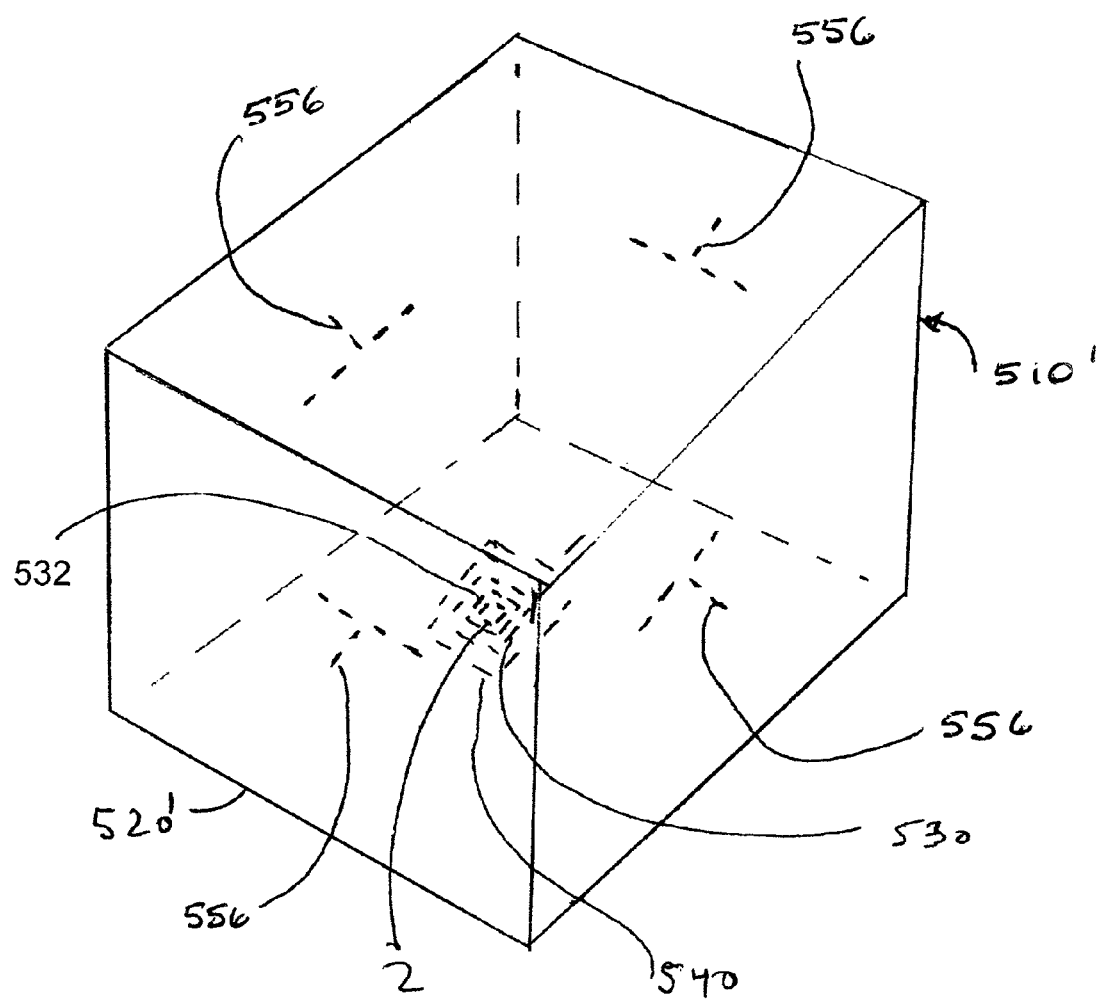
FIG. 9 is 3-d view of an alternative enclosure employed within the apparatus of FIG. 1.

Reference is now made to FIG. 9 wherein there is shown an integrated antenna enclosure, generally designated as 510', which is an alternative embodiment of the integrated antenna 510 on FIGS. 2-4. The integrated antenna enclosure 510' is shown as having a cube shape with an array of antennas 556 disposed on an interior surfaces thereof. As has been described before, the test fixture 540 with one or more sockets 532 in this case is mounted at the base 520', though the fixture 540 could be mounted in alternative configurations based on the configuration of one or more antenna elements 556.

The integrated antenna enclosure 510' functions in a similar manner to the aforementioned embodiment but is capable of a greater discrimination regarding the location origin of specific RF unintended emissions emitted by the device 2 under test by virtue of the separately located and oriented array of antenna elements 556 which may also be sensitive to separate RF frequency regions and or the improved location of emissions at a single frequency within the part. Other shaped enclosures are envisioned embodying a variety of geometric solid shapes, including combinations of pyramidal and non-pyramidal regions combined into a single enclosure.

Another configuration of the integrated antenna enclosure 510 would be a conical (circular cross section) shape with mounting provisions to the typically rectangular fixture 530 which defines one or more sockets 532, each configured for insertion of the electronic device 2 thereinto. Yet another configuration of the integrated antenna enclosure 510 defines a triangular shape. Yet another configuration would be similar to that of an exponential horn which is well known in the art.

Additional integrated antenna enclosure shapes include a parabola, or alternatively an elliptical sphere. Multiple antenna elements 556 positioned inside such devices would offer signal gathering capability from different angles, albeit with less total gain, sensitivity and broadband capability as the previously described arrangement. The one or more electronic devices 2 positioned in the fixture 540 mounted at the focus of an elliptical sphere, with the integrated antenna positioned to focus RF energy at the opposite focus point is also contemplated as a means to acquire more signal radiated from all directions of the one or more electronic devices under test 2.

The electronic one or more device 2 in the fixture 540 in the center of a sphere shaped integrated antenna enclosure, with antenna elements 556 at various locations from the surface of the sphere is also contemplated. This would offer a small volume and a strength of structure, but would offer less RF gain as the symmetrical 4 sided pyramid shape of FIGS. 2-4, with the electronic device 2 positioned at the opposite end of the horn on a conducting ground plane.

Now in further reference to FIGS. 1 and 7-8, the sensor and controller assembly 560 is connected to the integrated antenna enclosure 510 by way of connections 568 and 568a, each of which may be a conventional cable.

Figure 16:
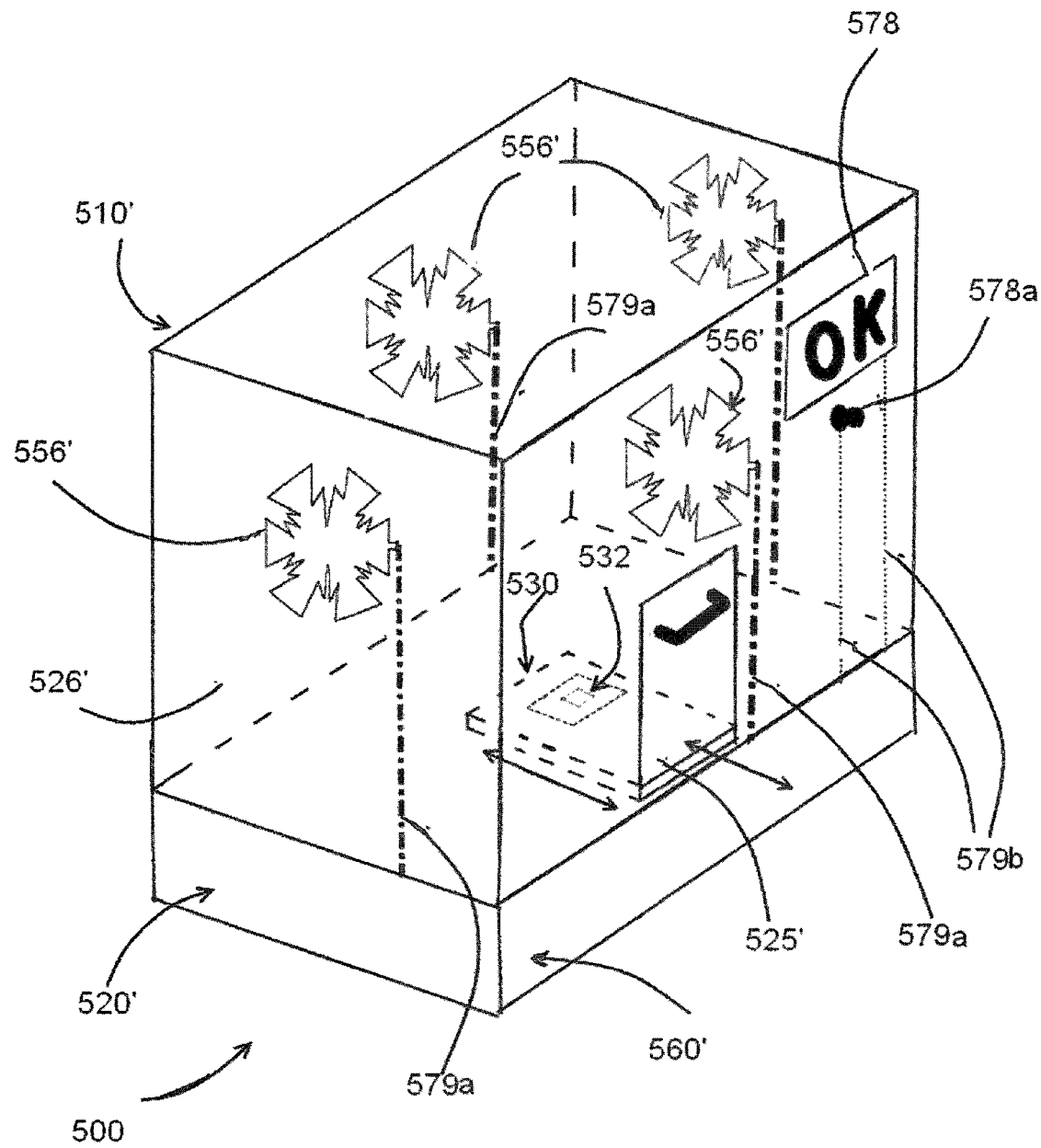
FIG. 16 illustrates a block diagram of another embodiment of the apparatus of the invention, particularly illustrating a unitary construction of the integrated antenna enclosure and the controller.

Preferably, the sensor and controller assembly 560 is positioned external to the enclosure 510 as a standalone unit as shown in FIGS. 7-8, though the sensor and controller assembly 560 and integrated antenna enclosure 510 can all be integrated into a unitary construction, for example as shown in FIG. 16. As has been described above, the sensor and controller assembly 560 is configured to source required signals to the one or more electronic devices 2 under test and to process the emission captured by the integrated antenna enclosure 510 so as to differentiate the counterfeit and/or substandard electronic devices 2 from authentic or genuine electronic devices 2.

In a further reference to FIG. 1, the sensor and controller assembly 560 of a presently preferred embodiment includes a housing 562 having an external connection 566 so as to source or connect the required signals to the integrated antenna enclosure 510 and a signal output module 564 mounted within the enclosure 562 and operatively connected the external connection 566. Also mounted within the housing 562 is a receiver 572, for example such as of a wideband RF type, which is operatively coupled to another external connection 570 and which is configured to acquire RF emission content from the connection 570 and convert the emission content from a time domain into a frequency domain.

The sensor and controller assembly 560 also includes a processing device 574, for example such as a microprocessor, essentially configured and operable to perform a pattern analysis on the signature of the emission received at the receiver 572, compare the results of such analysis against predefined patterns and make a final determination on a status of the one or more electronic device 2 and, more particularly, to determine whether such electronic device 2 is one of a genuine, counterfeit or substandard quality. Term substandard is to be interpreted herewithin as the electronic device 2 does not meet functional and/or performance requirements, for example as due to aging. In other words, such substandard electronic device 2 may have been removed from a used device and inserted into a new device or assembly intended to have all new components therewithin. The processing device 574 is configured and operable to execute automated detection algorithms for a real time detection of anomalies and counterfeits. It would be understood that processing device 574 provides means for determining anomalies of the electronic device 2.

Finally, the sensor and controller assembly 560 typically includes a user interface 576, at least including but not limited to a touch screen 578 operable from the exterior surface of the housing 562.

Instant invention contemplates that the structure and functionality of the sensor and controller assembly 560 may manifest themselves in different forms. The instant invention also contemplates that the signal output module 564 and modulation module 580 may be provided as a standalone sub-assembly, generally designated as 571.

Figure 10:
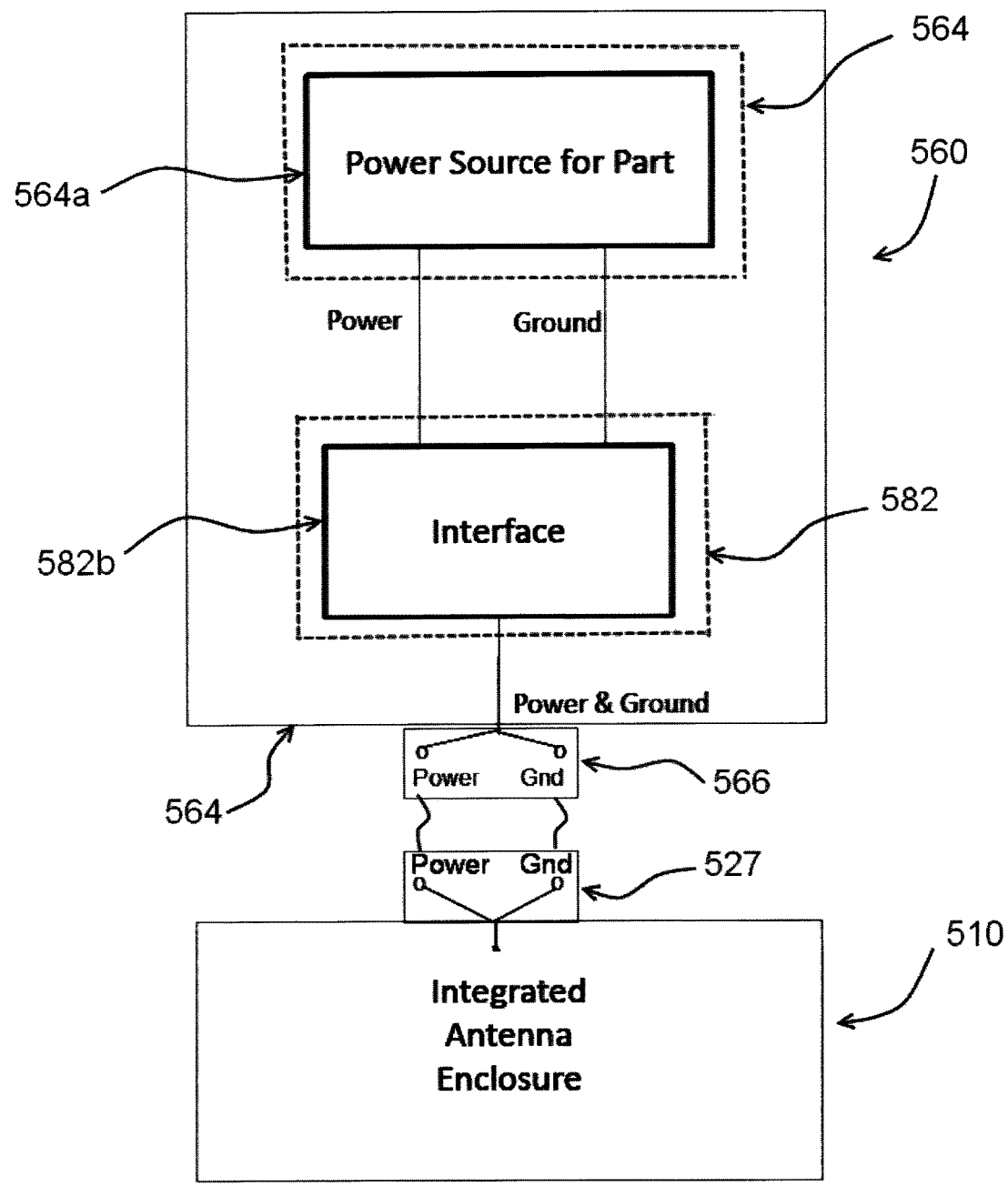
FIG. 10 illustrates a block diagram of one form of the apparatus of FIG. 1.

Now in a particular reference to FIG. 10, the invention contemplates that the one or more devices 2 is energized by one or both power and ground inputs/outputs signals. Accordingly, the signal output module 564 is configured and operable to source such ground and input/output signal by way of a power source 564a and interface circuit/board 582b.

Figure 11:
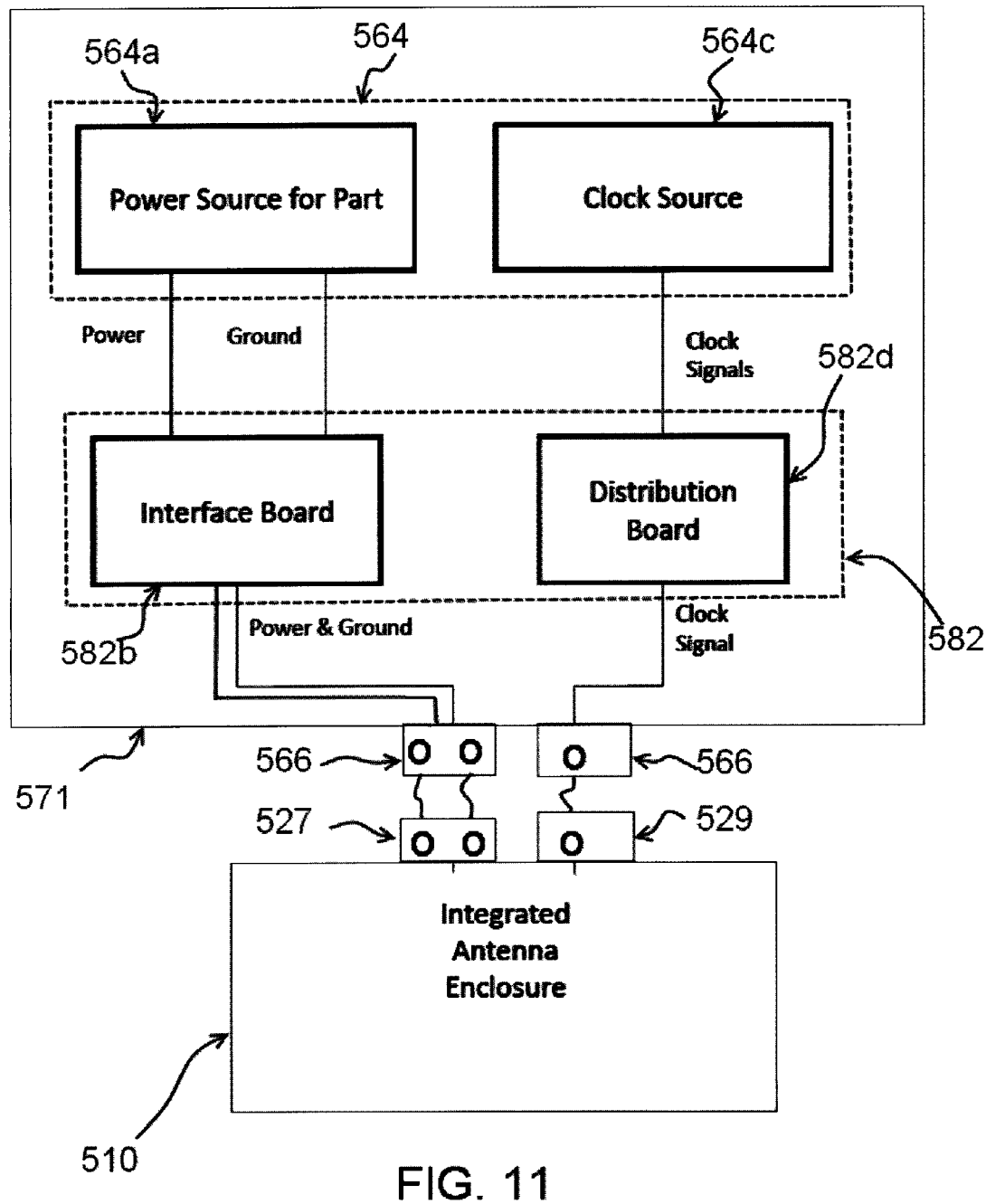
FIG. 11 illustrates a block diagram of another form of the apparatus of FIG. 1.

Now in a particular reference to FIG. 11, the invention contemplates that the one or more devices 2 are energized by both power and ground inputs/outputs and the clock input/output. In this form, the signal output module 564 is configured and operable to source such ground and input/output signal by way of the power source 564a and interface circuit/board 582b and also source the clock signal by way of a clock source 564c and distribution circuit/board 582d.

Figure 12:
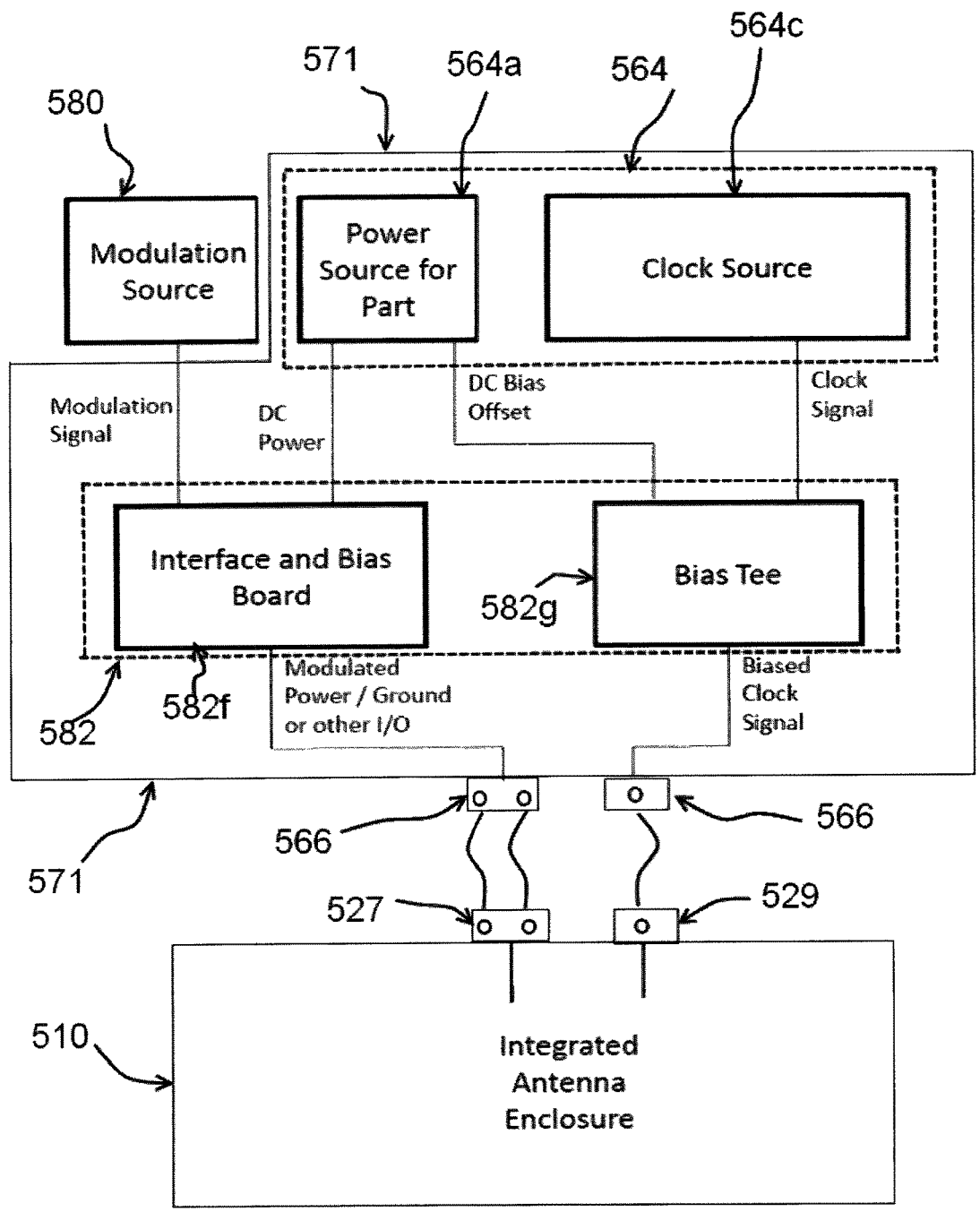
FIG. 12 illustrates a block diagram of yet another form of the apparatus of FIG. 1.

Now in a particular reference to FIG. 12, the invention contemplates that the one or more devices 2 are energized by both power and ground inputs/outputs and the clock input/output and that the power and ground inputs are modulated. In this form, the signal output module 564 is configured and operable to source such ground and input/output signal by way of the power source 564a and modulation source 564e connected to and interface and bias circuit/board 582f. The clock signal is sourced by way of a clock source 564c and bias circuit/board 582g, also having a connection with the power source 564a. The bias circuit/board module 582 is needed to modulate a static or non-static voltage.

Figure 13:
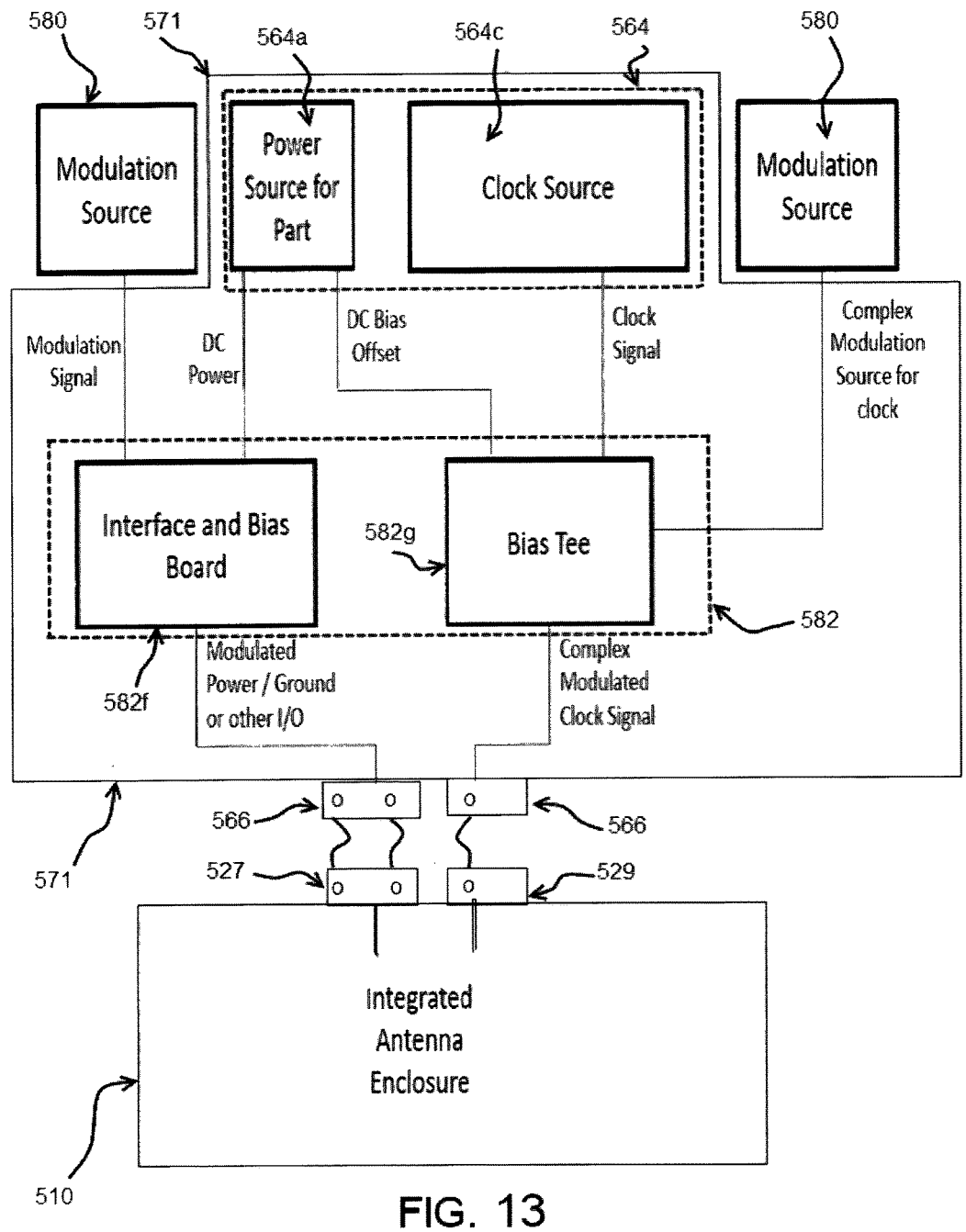
FIG. 13 illustrates a block diagram of another form of the apparatus of FIG. 1.

In another form of FIG. 13, the signal output module 564 of FIG. 12 is adapted with a clock modulation source 564h. Thus, the invention contemplates that the device 2 is energized by both power and ground inputs/outputs and the clock input/output and that the power, ground and clock inputs/outputs are modulated.

Figure 14:
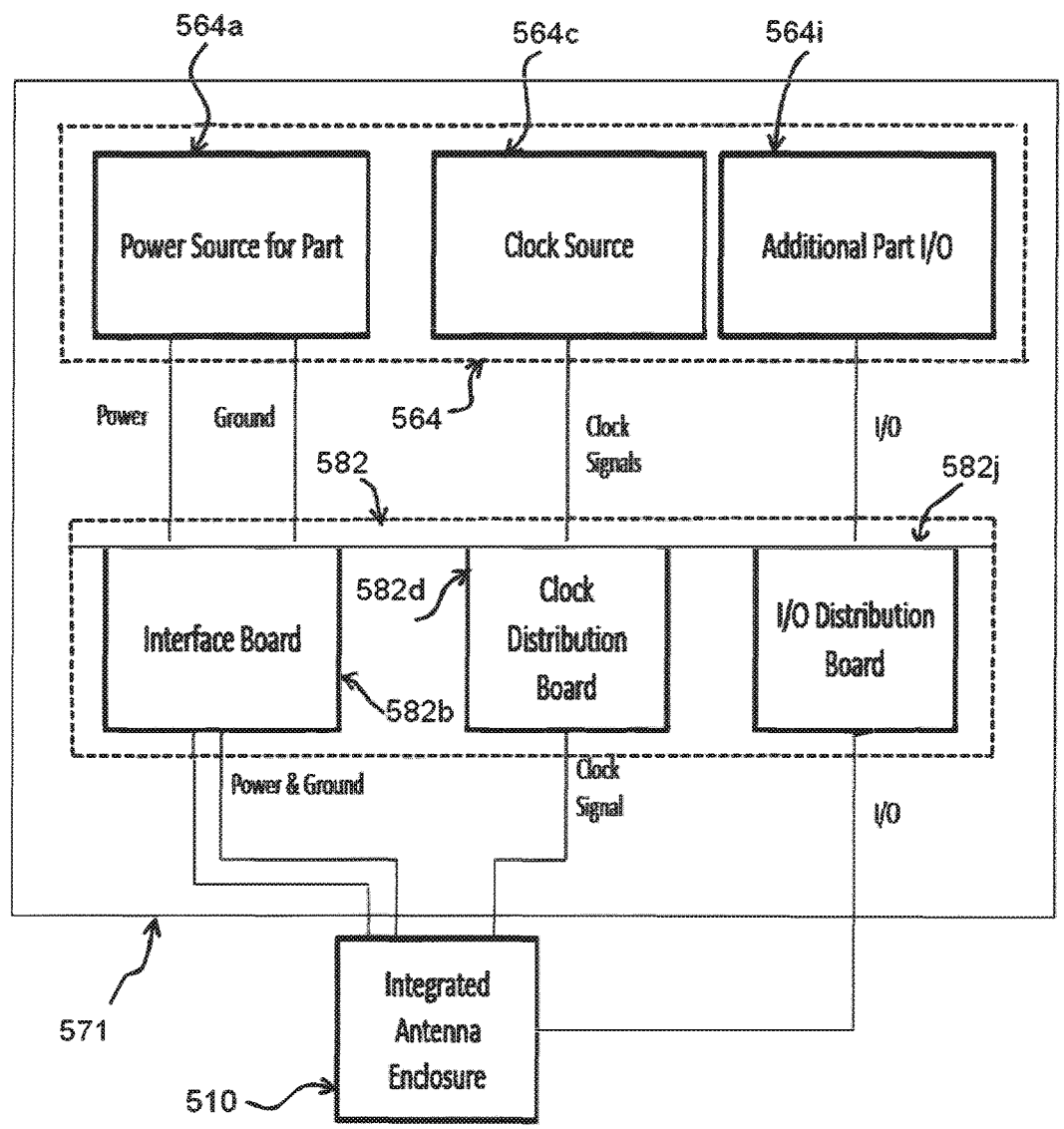
FIG. 14 is a block diagram of a further form of the apparatus illustrates FIG. 1.

In yet another form of FIG. 14, the signal output module 564 of FIG. 11 is adapted with additional input/output source 564i and its related circuit/board 564j. This distribution board 582j is used for cases when more than three inputs to the part are contemplated.

Figure 15:
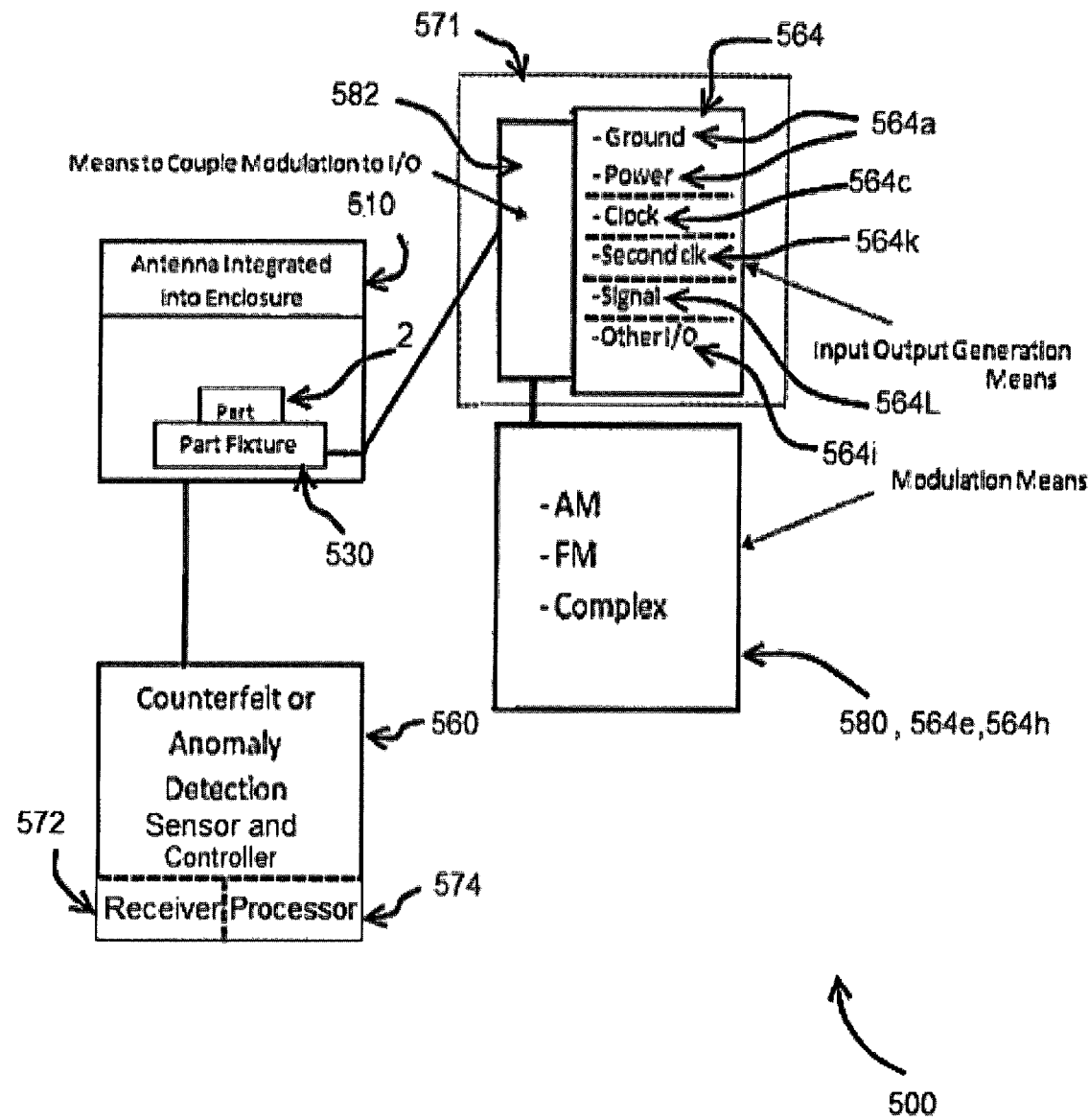
FIG. 15 illustrates a block diagram of another form of the apparatus of the invention.

In yet another form of FIG. 15, the invention contemplates that the signal output module 564 is provided remotely (removed) from the controller 560 and is further coupled to an optional modulation module 580, to be also meant as achieving the operation of above described modules 564e and 564h, so as to source non-modulated or modulated signals to the one or more electronic devices 2 under test. In FIG. 15, module 582 is comprised of at least one of 5682f, 582g, 582b, 582d and 582j. The signal output module 564 is comprised of at least one of 564a, 564c, 564i, the ground, additional clocks and any additional input/outputs (I/Os) 564i and signal I/O 564l. The signal output module 564 may also include a second clock source 564k.

In yet another exemplary form of FIG. 16, the integrated enclosure 510 and the controller 560 are provided as a unitary construction of an apparatus 500' having a cube or rectangular shaped enclosure 502 with the sensor and controller assembly 560' and antenna element(s) 556' mounted within an interior of such enclosure 510' and wherein the drawer 525' and user interface 578, further comprising a ON/OFF switch 578a, are accessible from the exterior surface of the enclosure 510'. It is contemplated that the sensor and controller assembly 560' is mounted within the base 520'.

The coaxial cable(s) 579a, mounted adjacent or inside the interior surface 526' connects the antenna element(s) 556' to the sensor and controller assembly 560' mounted within the base 520' and sends the antenna element(s) 556' received signal to the controller assembly 560'. Additionally, the human-machine interface control wiring 579b mounted adjacent or inside the interior surface 526' connects the ON/OFF switch 578a and user interface 578 to the sensor and controller assembly 560' mounted within the base 520'. The location on or inside of the interior surface 526' minimizes any unwanted interaction with signals emitted from the electronic device 2 mounted inside the socket 532.

When the signals to one or, preferably, all three pin connections 534, 536 and 538 are modulated together or separately, the modulation source 564a, 564h or 580 is operable to provide one of a pulse modulation, a duty cycle modulation, a phase modulation, an FM modulation, an AM modulation and any combinations thereof. Use of a modulation signal on one or more of these pin connections further enhances the emission signatures given off by the electronic device 2 being tested.

In one form, the modulation means 564a, 564h or 580 is provided by an oscillator input. The oscillator input can be any source that generates a frequency based oscillation. Some may be monotonic, such as for example, but clearly not limited to a crystal oscillator or ceramic resonator. Others may be very complex timing control signals, communication signals or signals reconstructed using an arbitrary waveform generator. In essence, there is a vast number of signals in modern electronics that provide oscillation between a high and a low state to coordinate, control, communicate with, synchronize, reference and provide a myriad of other actions on and of circuits. This oscillation is a significant source of energy that by the laws of physics in one manner or another via radiative and conductive means is emitted external to the electronics or electrical device.

The modulation logic mechanism is chosen specifically to enhance the differentiation between a counterfeit/substandard electronic device 2 and an authentic electronic device 2.

Figure 17:
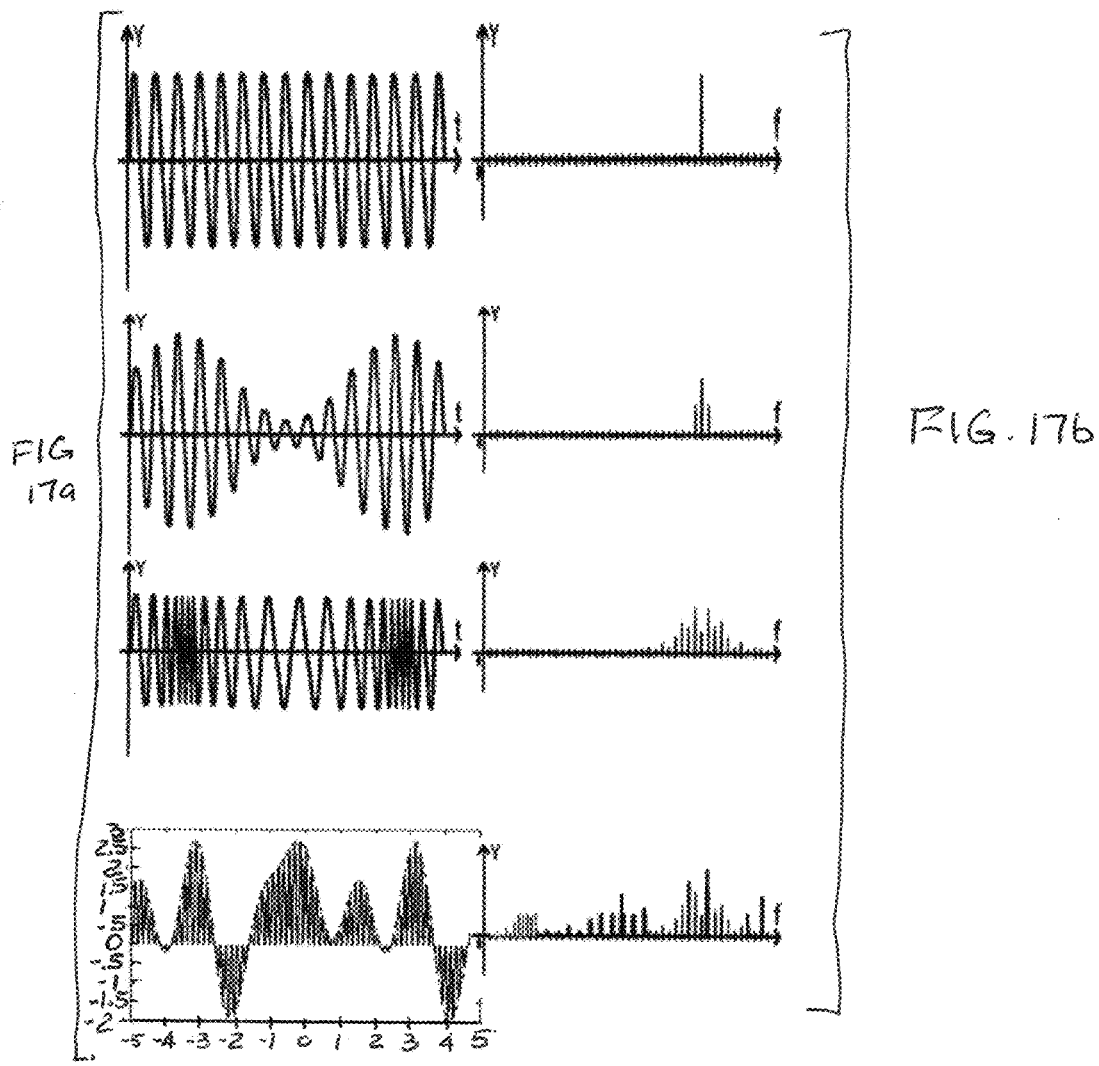
FIGS. 17a-b illustrate modulation techniques of a ground signal in time and frequency domains, respectively.
Figure 18:
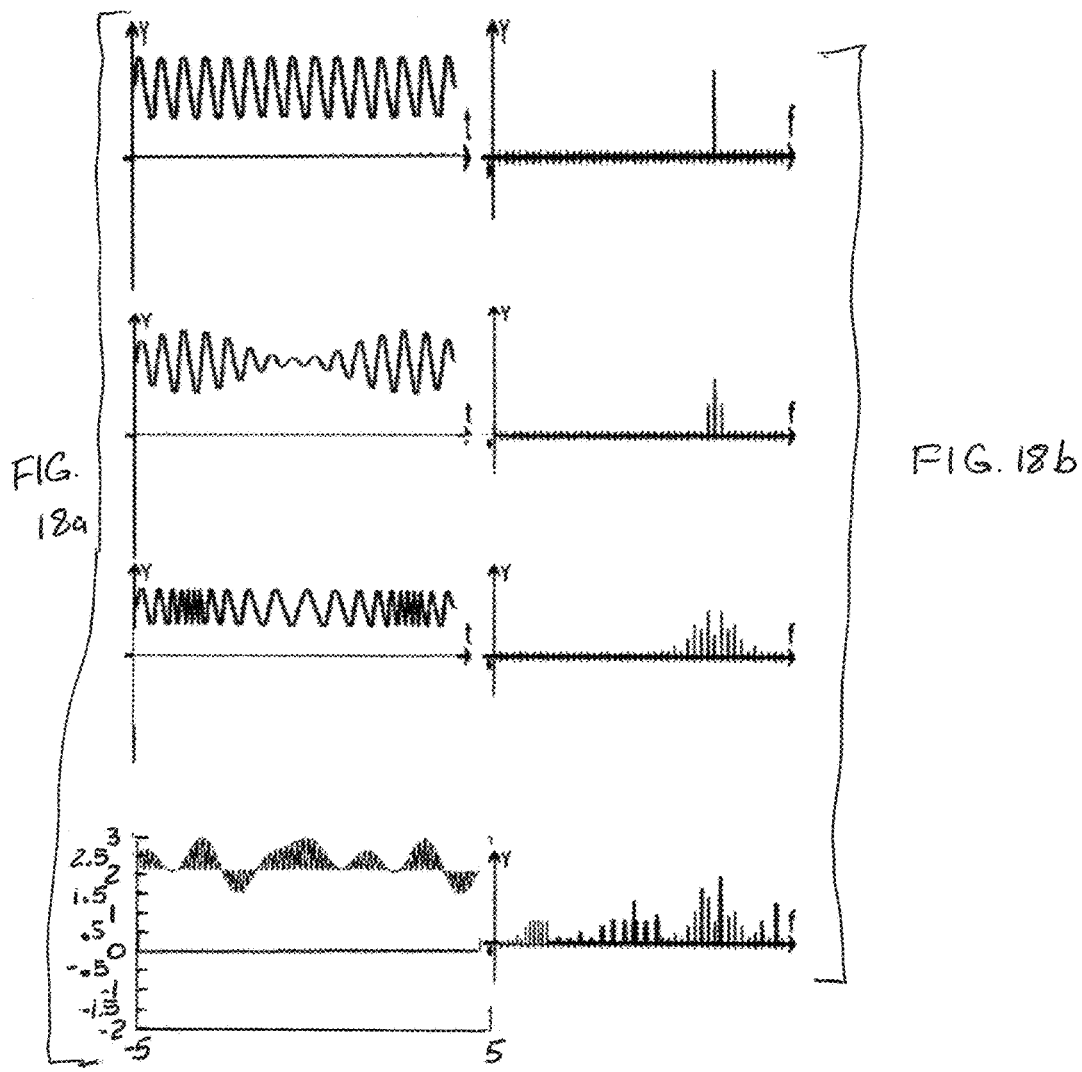
FIGS. 18a-b illustrate modulation techniques of a power signal in time and frequency domains, respectively.
Figure 19:
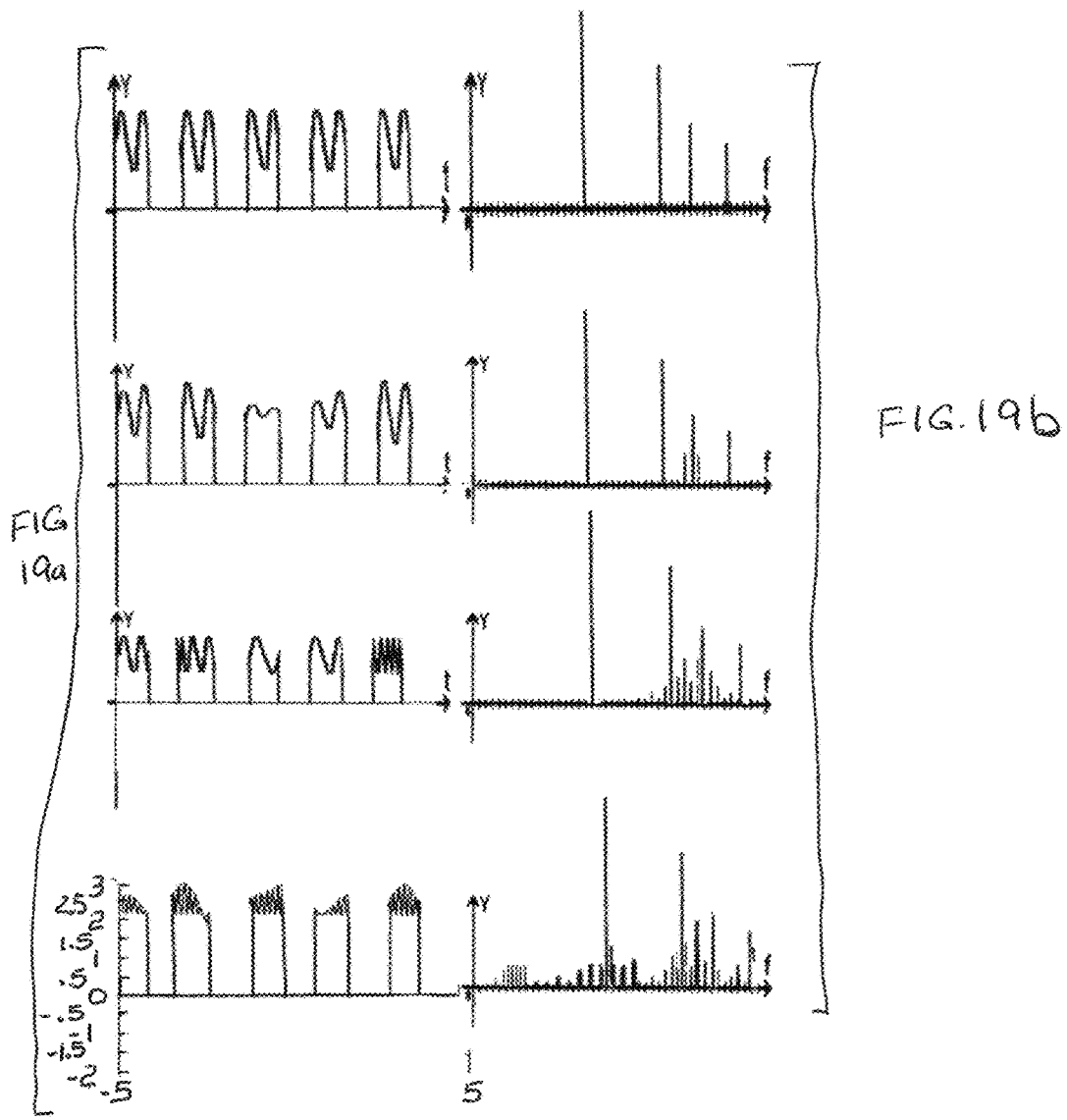
FIGS. 19a-b illustrate modulation techniques of a clock signal in time and frequency domains, respectively.

Now in a particular reference to FIGS. 17a-19b, therein are illustrated exemplary modulation techniques for each of a ground (FIGS. 17a-b), power (FIGS. 18a-b) and clock (FIGS. 19a-b) signals. FIGS. 17a, 18a and 19a illustrate modulation techniques in a time domain with voltage along the Y-axis and time along the X-axis and FIGS. 17b, 18b and 19b illustrate modulation techniques in a frequency domain with power (in decibels) along the Y-axis and frequency along the X-axis.

Enhanced modulation techniques envisioned herein include but are not limited to modulating multiple inputs or outputs substantially simultaneously with the same or different signal, modulating multiple such pins with a phase shifted signal relative to each other, using the results of the modulation to change modulation in a multi-step approach, applying a series of different modulation patterns to the device under test, applying a randomized modulation pattern to seek new useful discriminating emission results, briefly applying modulation which briefly exceeds the specified voltage, current or frequency limits of the component under test, simultaneously changing frequency, phase and amplitude of the modulation signal, applying the modulation to typically unmodulated pins such as power, ground, reset, chip select or similar, applying modulation which briefly causes the component to be operated at under the vendor specified minimum limits such as in an under voltage condition, briefly modulating the pin to a reverse bias state while limiting the modulation current available, and modulating a pin at a far higher or lower frequency range than is vendor specified.

As has been shown above, the modulation logic mechanism includes controls that can be resident as part of the integrated antenna enclosure 510 or can be part of the sensor and controller assembly 560 that measures and compares the signatures between electronic device 2 to determine if the electronic device 2 is counterfeit/substandard or if there are any other anomalies that would infer an inadequate electronic device 2 for quality control activities.

In another embodiment, the invention also provides a method of detecting and/or identifying counterfeit and/or substandard electronic devices. The method comprises the step of mounting one or more electronic devices in a fixture, the fixture is then emplaced within a hollow interior of an enclosure having an antenna integrated therewithin. Next, applying a signal to one of a power, clock and ground pins of each of the one or more electronic devices, the device under test is induced to create RF emissions. Then, capturing, with the antenna, emission of a radio frequency (RF) energy from each of the one or more devices having the connections applied thereto, the characteristics are made available for analysis. Finally, detecting and/or identifying, with a processing means connected to the antenna, one of an authentic, a counterfeit and a substandard condition of the each of the one or more electronic devices, a determination regarding authenticity, suitability, age, origin, or functionality is made.

To further enhance the overall system's discrimination capability, one or more specifically chosen or configured modulation signals may be applied to one or more of the connected inputs or outputs, typically the power, clock or ground pins detailed above.

The method also contemplates the step of selecting each of the power, clock and ground pins as an input pin or an output pin.

In a further embodiment, the invention provides a method of detecting and/or identifying counterfeit and/or substandard electronic devices. The method comprises the step of mounting one or more electronic devices in the fixture shown in FIG. 5 and emplacing the fixture within a hollow interior of an integrated antenna enclosure therewithin. Next, applying three and only three signals to power, clock and ground pins respectively of each of the one or more electronic devices, the device under test is induced to create RF emissions. Then, capturing, with the integrated antenna enclosure, emission of a radio frequency (RF) energy from each of the one or more devices having the modulated signals applied thereto, the characteristics are made available for analysis. Finally, detecting and/or identifying, with a processing means connected to the integrated antenna enclosure, one of an authentic, a counterfeit and a substandard condition of the each of the one or more electronic devices.

The method contemplates an optional step of applying a modulation to one or more of the power, clock and ground pins of each of the one or more electronic devices 2 so as to enhance emissions signatures for differentiating authentic/ genuine electronic devices 2 from counterfeit or substandard electronic devices 2. In this embodiment, each of the power, clock and ground pins may be selected as an input to or an output from the electronic device 2. In other words, a modulation can be applied to a pin that typically outputs a signal. The modulated signal will still propagate deep into the device generating unique emissions for device internal components that are connected to that pin.

Figure 20:
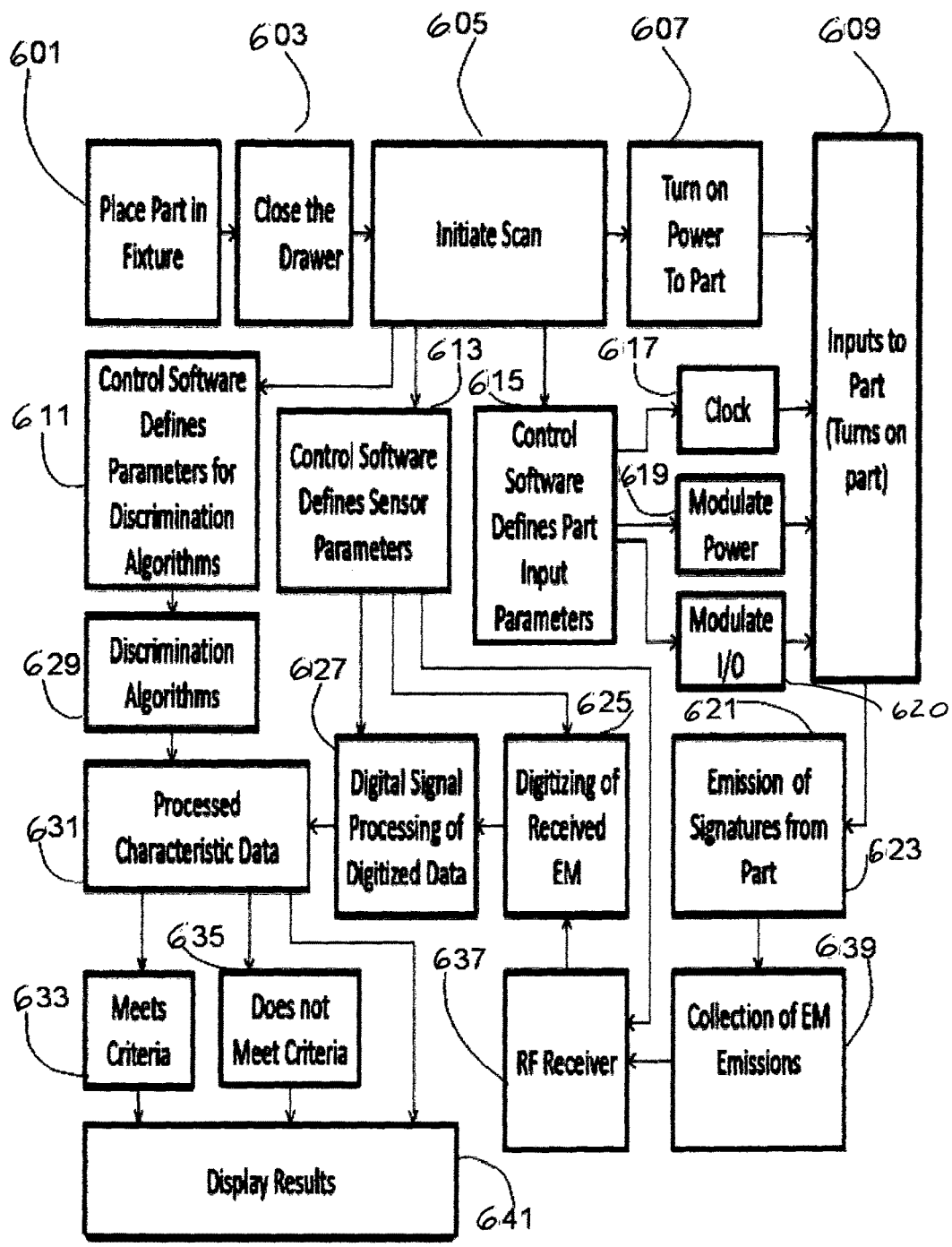
FIG. 20 illustrates a block diagram of an exemplary logic algorithm executed by the apparatus of FIG. 1 or 16.

Now in a particular reference to FIG. 20, the exemplary method includes the step 601 of manually or automatically placing the device 2 into the socket 532 while the drawer 525 is open. The drawer 525 is manually or automatically closed in step 603 and the scan is initiated in step 605 by applying power in step 607. This places the electronic device 2 in the optimal position to transmit the emissions and also simultaneously seals the container from unwanted external RF interference. It is important to note that the act of closing the drawer 525 also automatically moves the electronic device 2 inside its socket 532 to substantially the center of the volume opposite the antenna apex at connection 528 and in substantially optimal position location for the transmission and receiving of the electronic device 2 emissions by the sensor unit. This location is significantly above any interfering ground plane reducing unwanted effects which may reduce overall unintended signal emissions.

The base 520 of the integrated antenna enclosure 510 serves several functions to complete the enclosure shielding, to support the electronic device 2 physically and mechanically, to support the horizontal movement of the drawer 525 and support the drawer 525 physically, to form a structure which is used to seal the integrated antenna enclosure from external RF effects and atmosphere and to provide a means for stable placement onto a surface suitable to act as a user workstation.

Step 605 also triggers the step 613 wherein the logic executed by the processing device 574 defines parameters for the sensor and controller assembly 560 and further triggers step 615 wherein the logic executed by the processing device 574 defines input parameters to the device 2. Step 605 also initiates, the logic executed by the processing device 574 and defines parameters for RF signal discrimination algorithms. Step 615 configures the power, ground, clock source and modulation parameters using circuits/boards 564*a*, 564*h* and/or 582 that provide means for modulating an input and/or output pin of the electronic device 2. Steps 617, 619 and 620 generate the configured inputs that are subsequently applied to the electronic device 2 through step 609. These steps thus provide predesignated signals to the predesignated pins of the electronic device 2.

When powered, the electronic device 2 emits electromagnetic energy in step 623 that are gathered by the integrated antenna enclosure 500 via the antenna structure 556 in step 639 and is received at the RF receiver 572. The RF receiver 572 thus receives the intended or unintended emissions 4 from the electronic device 2, which proceed outward from the electronic device 2 where the emissions 4 are gathered by an antenna means and sent typically by a coaxial cable 568*a* to the RF receiver 572. The RF receiver 572 typically employs a sensitive low-noise amplifier (LNA) to amplify the emission signals first.

The received RF emissions are digitized in step 625 with the digital signal processed in step 627. Further, in step 631, the logic algorithms executed by the processing device 574 characterize the RF emission signature and the device 2 is either found as meeting a predetermined performance criteria or a predetermined emission signature in step 633 or is found as counterfeited or substandard in step 635. When required, the results are displayed on a display 576 in step 641.

Figure 21:
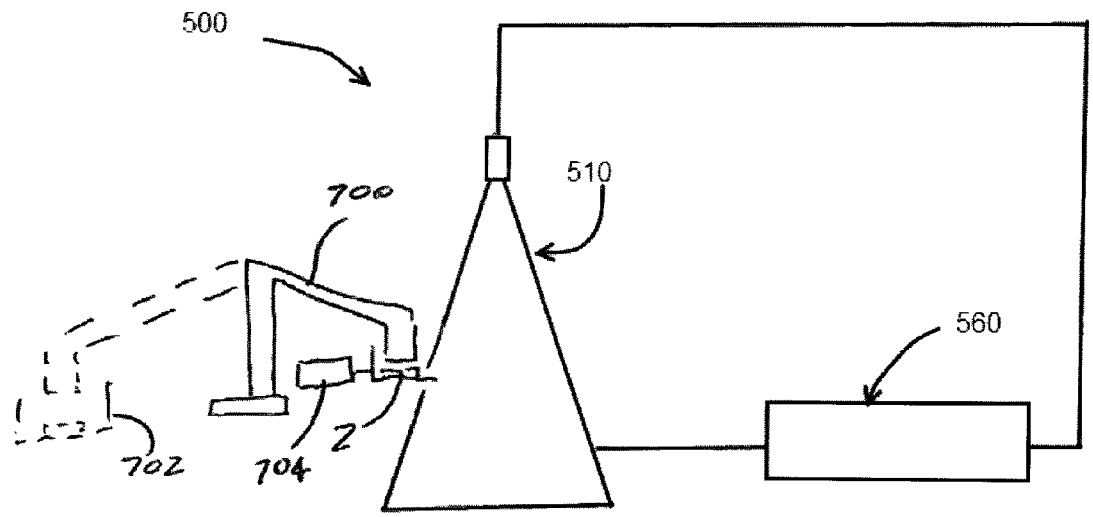
FIG. 21 illustrates a block diagram of the apparatus of FIG. 1 or 20 configured for a robotic application.

From the user's perspective, a typical operating sequence of the invention is as follows. Access to the fixture 540 and its part socket 532 inside the integrated antenna enclosure 510 is obtained by opening/pulling out the drawer 525. The electronic device 2 to be tested is placed into the fixture 530. The drawer 525 is closed, sealing the integrated antenna enclosure 510 from external RF noise and simultaneously completing the internal antenna configuration. One or more signals is/are automatically or manually, by way of process initiation through a switch 578*a*, applied to the predesignated electronic device pins and the receiver 572 begins receiving all emissions from the electronic device 2 under test. The RF receiver 572 then converts the time domain received emission data to a frequency domain data and the processing device 574 begins analysis of the frequency domain data. The intended and unintended emissions portion of the spectrum are processed and compared to a baseline configuration. If there is a significant deviation from the expected baseline emissions configuration, the software logic executed within processing device 574 determines whether or not the electronic device 2 is a suspected counterfeit. If sufficient deviation from the baseline configuration is not identified, processing device 574 software determined that the electronic device 2 is not a suspected counterfeit and is authentic. The software then executes an action to categorize the electronic device 2 into its correct classification. If the operation is being done manually, the user of the apparatus 500 is notified of the status of the electronic device 2 and the user than places the electronic device 2 in its appropriate category, separate from the electronic devices 2 previously categorized differently. The operation may be automatically performed whereby the door 525 is automatically opened, and the electronic device 2 is automatically removed by means such as a robotic arm 700 of FIG. 21, and the electronic device 2 is placed into the bin or holder 702 with the other associated electronic devices 2 belonging to its classification set. The next candidate electronic device 2 is located and the above process is repeated.

Figure 22:
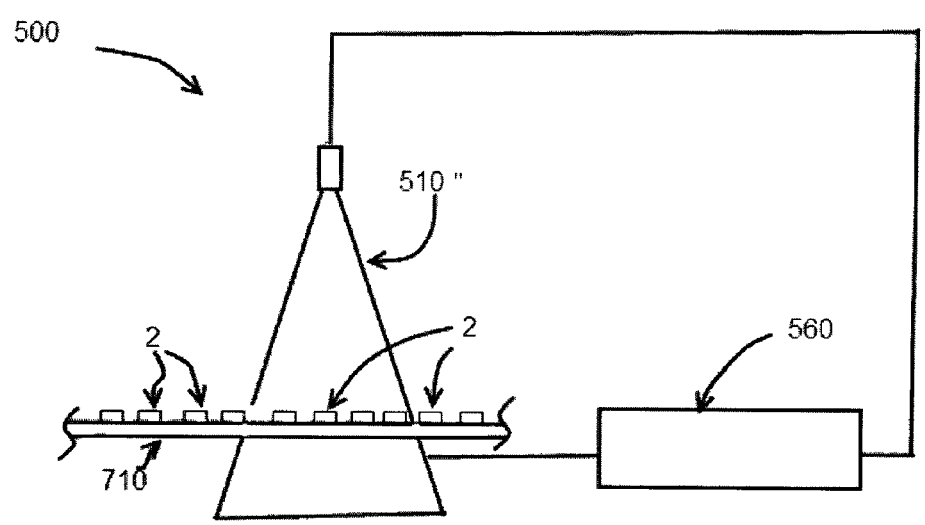
FIG. 22 illustrates a block diagram of the apparatus of FIG. 1 or 20 configured for testing electronic devices mounted on a conventional tape.

It must be noted the invention contemplates not only a manual but also a fully automatic operation, for example as illustrated in FIG. 22, wherein the integrated antenna enclosure 510" is adapted to receive a conventional tape 710 therethrough, with the tape 710 containing plurality of electronic devices 2 thereon. It would be understood that the connections to the ground, power and/or clock pins of the electronic device 2 can be of a movable type, with exact means to achieve either linear or pivotal movement thereof not being critical for the instant invention. A combination of automatic and manual actions are also contemplated such as the automatic access of a new electronic device 2, the automatic placement of the previously tested and categorized electronic device 2 in a predesignated location, while the user places the current electronic device 2 into the fixture 530.

The user may be notified of the electronic device's counterfeit versus authentic status via user interface 576, such as a computer screen, LED light, and/or buzzer typically located on the sensor and controller assembly 560. The sensor and controller assembly 560 may also notify the user, for example by way of the user interface 578, of its operational status, whether it is ready to accept a new electronic device 2, currently testing an electronic device 2, the estimated time remaining to complete the electronic device testing, the final determination, and other facts including the electronic device number that the fixture is currently configured for. This information is useful in an environment employing multiple machines tended by only one or few users. The integrated antenna enclosure 510 may have a limit switch (not shown) associated with the drawer 525 to sense its open/closed/intermediate position location status. The integrated antenna enclosure 510 may have an electromechanical actuator 704 to open or close the access drawer 525 automatically. The apparatus 500 may have a means of marking or permanently disabling a counterfeit electronic device while it is in the fixture 530 and before its removal, such as painting, cutting off electronic device pins, drilling through the electronic device, overloading and/or reverse biasing the electronic device inputs, this again being done before the electronic device 2 is removed from the fixture 530, manually or automatically. The integrated antenna enclosure 510 may include an optional lock for the drawer 525 while the electronic device 2 is undergoing tests, especially if the tests are extensive and the user may not always be present, or may be attending to other apparatus' 500 nearby.

Figure 23:
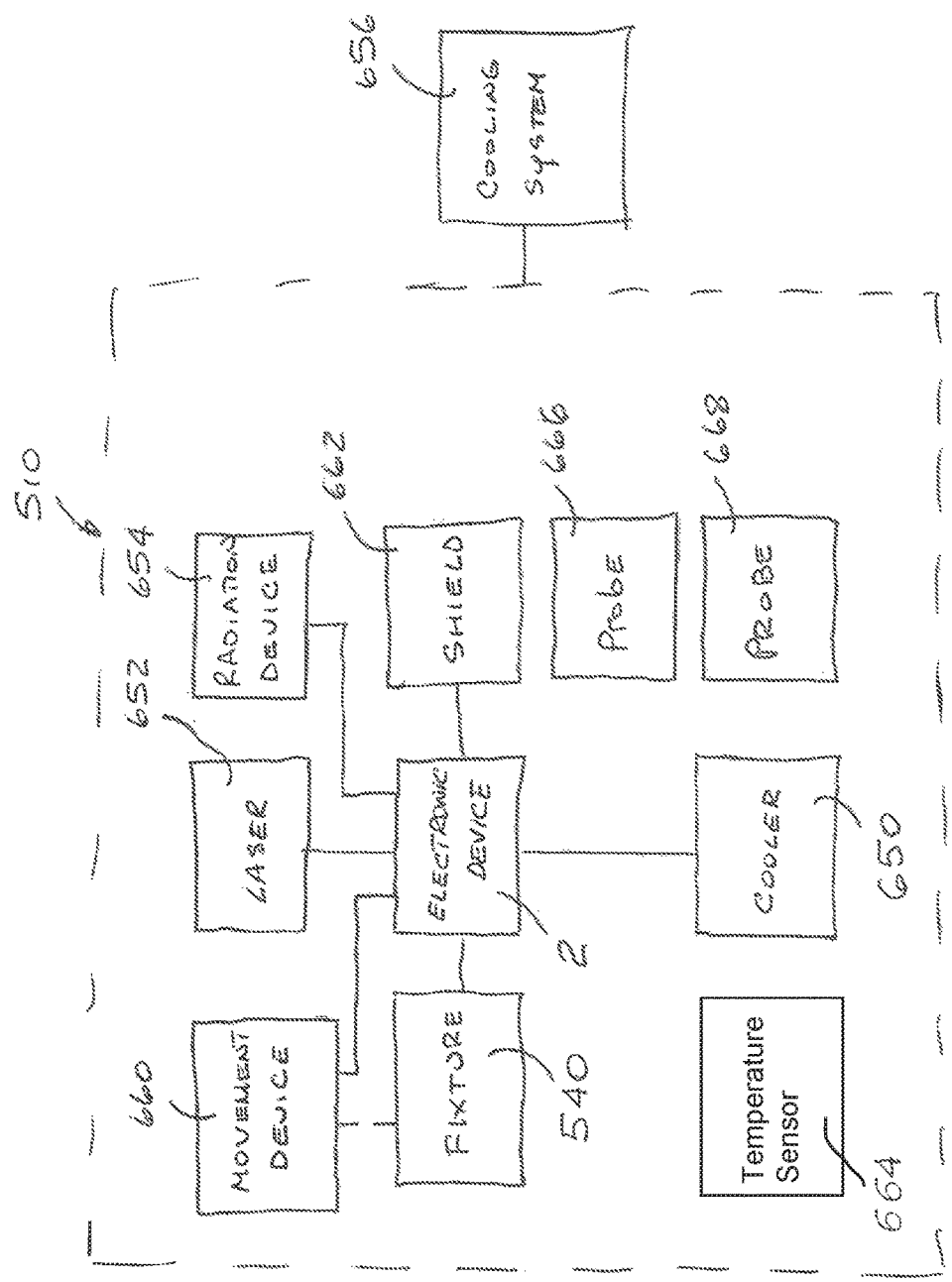
FIG. 23 illustrates a block diagram of yet another form of the apparatus of the invention.

Now in a particular reference to FIG. 23, the invention contemplates additional optional devices and or routines to enhance operation of the apparatus 500 or 500'. The integrated antenna enclosure apparatus 510 or 510' may be further configured to create a condition so as to operate at temperature or pressure ranges outside the normal testing, laboratory, manufacturing or device operating limits to further extract features of significance. A vacuum can be useful in enhanced thermal isolation and imaging of an active electronic device 2. The apparatus 500 or 500' may be configured to heat or cool separate regions of the electronic device 2 under test to different values using a thermoelectric cooler 650, mounted below the socket 532 or infrared laser 652 mounted within the hollow interior 512 above the socket 532. The apparatus 500 or 500' may be configured to illuminate the electronic device 2 under test with an external RF radiation or millimeter wave radiation or X-ray radiation device 654 mounted within the hollow interior 512. The apparatus 500 or 500' may be further adapted with an external cooling system 656 coupled to the peripheral wall 524 thus capable of being cooled and/or being a superconductor to more effectively shield and contain any RF emissions. The apparatus 500 or 500' further may have electrostatic plates or magnetic coils or an array of antennas, magnetic coils or electrostatic plates adjacent to, above or below the electronic device 2 and operable to induce voltages or currents in specific selected regions of the electronic device 2 under test. The apparatus 500 or 500' may further include a powered articulated movement device 660 connected to the socket 532 or to the fixture 540 and operable to change a spatial orientation of the electronic device 2 under test to within the hollow interior 512. The apparatus 500 or 500' may further be configured to manipulate a grounded electromagnetic shield 662 mounted adjacent or around the electronic device 2 under test to inhibit unneeded emissions from specific regions of the electronic device 2 from being received, or to influence the near-field pattern of the emissions, or to further discern the specific location or region of emissions being received. The apparatus 500 or 500' may further be operable, through the signal output module 564 and fixture 530, to add resistance, inductive reactance, capacitive reactance, a combination of the preceding resistances and reactances, or impedance to the ground, power or other pins of the electronic device 2. The apparatus 500 or 500' and, more particularly, the signal output module 564, may be further configured to change power supply filtering component values such as selecting or disabling filter capacitors especially lower capacitance higher frequency components. The apparatus 500 or 500' and, more particularly, the signal output module 564, may be configured to provide selected real-time feedback of RF-emission frequency regions back into the modulation circuitry feeding one or more pins of the electronic device 2. The apparatus 500 or 500' may further include a temperature sensor 664, preferably mounted within the hollow interior 512, being configured and operable to detect the temperature of the electronic device 2 under test, or the temperature of specific regions of the electronic device 2 under test. The apparatus 500 or 500' may further include a probe 666 or any other suitable means configured to detect the current drawn in any of the device' pins at any point during the test procedure or modulation to further discriminate between the characteristics of the electronic devices 2. The apparatus 500 or 500' may further include a Hall-effect magnetic sensor and controller assembly probe 668 positioned over the electronic device 2 under test and operable to determine overall current region profiles exhibited by the device. The apparatus 500 may be further configured and operable to apply a sequence of the above tests, in varying combinations or degrees depending on the previous outcomes of prior tests, to further discern the authenticity or counterfeit nature of the electronic device 2 on the edge of the criterion boundary calculations between the two. The apparatus 500 may be configured to further repetitively redo the above tests on the electronic device on the edge of the criterion boundary calculations to gather a substantially larger statistical sample for higher discrimination decision certainty. The apparatus 500 may automatically redo the above tests until a preset threshold of statistical certainty is achieved. Thus, the number of test or test's chosen may not be preset but may be adaptable based on the results of earlier tests or on the accumulated knowledge or statistics from recent earlier runs or long-term gathered data. Thus, the processor 574 may be programmed to execute Artificial Intelligence routines so as to retain a knowledge of tests routines/types that are most efficient in finding a specific type of counterfeit for a batch of test electronic devices 2 and applying those tests routines/types at the earliest to more quickly or with more certainty ascertain the authenticity of the electronic device 2 under test. The apparatus 500 may be configured to categorize different groups of counterfeited electronic devices 2 based of differing results from different tests performed on the set of electronic devices. The apparatus 500 may use the categorized groups to change the weighting of the tests performed or change the duration of the tests performed to optimize test time or test certainty or a combination of the two based on the cost or availability of the electronic device 2 and based on the criticality and cost of apparatus' failure of the system the electronic device 2 is to be built into.

The apparatus 500 or 500' further may be capable of modulating the input to only one pin of the electronic device 2 under test, the remaining unconnected pins being considered substantially to be an antenna ground, and the entire device under test being considered to be one complex antenna.

The reader is advised to note that FIG. 14 illustrates an embodiment with no modulation, but with added I/O to pins other than Power, ground and clock. These added I/O signals may exercise the electronic device 2 under test in a new and/or complex manner, possibly causing a state change or causing additional processing to be performed, resulting in additional or different internal circuitry being exercised. An example of this would be exercising an address bus used for DMA transfers or turning on/off a chip select pin. In a further test, there is provided a separate clock signal to a SPI serial bus which typically requires its own clock and separate clock frequency to transfer data.

The reader is further advised to note that it is not accepted common practice to modulate the ground, power or clock signals. In the vendor specification and in routine operations, the electronic device 2 is typically supplied with power, clock and ground as stable and unvarying as possible. The instant invention, albeit counterintuitive to normal accepted circuit interface and operation, departs from a conventional wisdom of testing electronic device 2 and deliberately introduces one or more variations to effect a more measurable vendor unintended emission. Most vendor supplied specifications state a maximum input voltage ripple to power, and maximum clock variation parameters. The instant invention seeks to maximize these variations to enhance counterfeit detectability. Another way to view the approach of the instant invention is to note that electronic circuit design normally stresses the removal of noise and extraneous signals, filtering it out using a variety of means such as filter capacitors or low pass or bandpass filters. It is typically common sense to remove as much noise as possible. The instant invention's modulation provides a time varying signal that propagates throughout the traces of electronic devices 2 under test. As the power, ground and clock typically reach the maximum amount of the electronic device's circuitry and are integrally involved in all operations of the electronic device, the introduced modulated signals reach all operating circuits of the electronic device 2 under test.

The instant invention thus uses input signal variations including, but not limited to a variety of modulation means to further enhance unintended output signals. The instant invention achieves a leveraging effect whereby a small amount of input signal modulation creates a large amount of unintended RF emissions 4 for detecting or verifying the authenticity of the electronic device.

Other input signal types different from repetitive modulation patterns include introduction of a broadband or a narrowband noise and a pseudo-random noise. If the modulation added to select input pins is of a low level nature within the vendor specification for that electronic device's input, the modulation enhances characteristics of the unintended emissions without effecting performance of the electronic device.

Combinations and permutations of the above tests may be applied simultaneously, sequentially or in varying degrees simultaneously and/or sequentially to enable greater discrimination between authentic and counterfeit components.

Although the present invention has been shown in terms of the apparatus and method for detection and/or identification of counterfeit and/or substandard electronic devices 2 of a semiconductor type, it will be apparent to those skilled in the art, that the present invention may be applied to other electronic devices, for example such as circuit boards and assemblies including circuit boards with the fixture 530 being modified to receive such electronic devices.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. An apparatus for detection and/or identification of counterfeit and/or substandard electronic devices, said apparatus comprising:
   (a) an enclosure including a base and a peripheral wall having at least one of a pyramid shape, a cubical shape, a rectangular shape, a tapered conical shape, a tapered triangular shape and defining a hollow interior of said enclosure;
   (b) a fixture mounted within said hollow interior of said enclosure, said fixture configured to receive one or more electronic devices therewithin;
   (c) three and only three connections configured to apply three and only three signals to three pins on each of the one or more electronic devices received within said fixture, wherein each of said three and only three signals is applied to a selectively distinct pin;
   (d) means for modulating at least one of said three signals;
   (e) an antenna being at least one of mounted on an interior surface of said peripheral wall, integrated into a thickness of said peripheral wall of said enclosure or an enclosure structure itself designed to act as said antenna, said antenna operable to capture an emission of a radiofrequency (RF) energy from the each of one or more electronic devices received within said fixture and having said modulated signals applied thereto; and
   (f) a sensor and controller assembly connected to said fixture and said antenna and configured source said three and only three signals, to process a signature of said captured emission and determine a condition of the each of the one or more electronic devices based on said signature.

2. The apparatus of claim 1, wherein said three and only three connections include connections to power, clock and ground pins of the each of the one or more electronic devices.

3. The apparatus of claim 1, wherein a combination of said enclosure and said antenna is configured to at least one of shield said hollow interior from effects of external environmental emissions of RF energy and to capture the RF energy that is generated internal to said hollow interior.

4. The apparatus of claim 1, wherein said sensor and controller assembly is operable to differentiate counterfeit and/or substandard electronic devices from authentic electronic devices.

5. The apparatus of claim 1, wherein said selectively distinct pin is one of an input to and an output from the each of the one or more electronic devices.

6. The apparatus of claim 1, wherein said means for modulating said three signals is operable to provide one of pulse modulation, phase modulation, FM modulation, AM modulation and any combinations thereof.

7. The apparatus of claim 1, wherein said enclosure comprises a drawer mounted for a movement, in a generally horizontal plane during use of the apparatus, to selectively allow access into said hollow interior, said fixture being mounted on an interior portion of said drawer.

8. An apparatus for detecting a condition of one or more electronic devices, said apparatus comprising:
   (g) an integrated antenna enclosure having an antenna integrated therewithin, said antenna being at least one of mounted on an interior surface of a peripheral wall of said integrated antenna enclosure, integrated into a thickness of said peripheral wall or an integrated antenna enclosure structure itself designed to act as said antenna;

(h) a fixture mounted within a hollow interior of said enclosure, said fixture being configured to receive the one or more electronic devices and connect one or more signals to each of the one or more electronic devices;

(i) said antenna operable to capture an emission of a radiofrequency (RF) energy from the each of one or more electronic devices received within said fixture and having said modulated signals applied thereto; and (d) a sensor and controller assembly mounted externally and connected to said integrated antenna enclosure and configured to process a signature of said emission of said radiofrequency (RF) energy from the each of one or more electronic devices having said one or more signals connected thereto and determine the condition of the each of one or more electronic devices based on said signature.

9. The apparatus of claim 8, wherein said fixture is configured to apply three and only three signals to three pins on the each of the one or more electronic devices received within said fixture, wherein each of said three and only three signals is applied to a selectively distinct pin.

10. The apparatus of claim 9, further comprising means for modulating at least one of said three and only three signals.

11. A method comprising the steps of:
(a) mounting one or more electronic devices within a hollow interior of an integrated antenna enclosure, said integrated antenna enclosure comprising an antenna;
(b) applying three and only three connections to power, clock and ground pins of each of said one or more electronic devices at least one of which may or may not be modulated;
(c) capturing, with said antenna, emission of a radiofrequency (RF) energy from each of said one or more devices having said modulated signals applied thereto; and
(d) detecting and/or identifying, with a sensor and controller assembly connected to said antenna and receiving said captured emission, one of an authentic, a counterfeit and a substandard condition of said each of said one or more electronic devices.

12. The method of claim 11, wherein the step (b) includes the step of selecting each of said power, clock and ground pins as an input pin or an output pin of said one or more electronic devices.

13. An apparatus for detecting a condition of one or more electronic devices, said apparatus comprising:
(a) a shielded enclosure including at least one of a single conformal antenna and an array of at least one conformal antennas being integrated therewithin;
(b) a fixture mounted within a hollow interior of said shielded enclosure, said fixture being configured to provide a means for temporarily affixing the one or more electronic devices providing an input or an output signal to at least one pin in the one or more electronic devices under test;
(c) a sensor and controller assembly connected to said shielded enclosure and configured to process a signature of an emission of a radiofrequency (RF) energy from the each of one or more electronic devices having said input or said output signal connected thereto;
(d) automated algorithms executed by a processing device disposed within said sensor and controller assembly that automatically provide, based on said signature, assessments of a condition of the one or more electronic devices being disposed within said fixture and being tested within said shielded enclosure; and (e) a means for automatically providing a visual display of a determined condition of the one or more electronic devices to a user.

14. An apparatus for detection and/or identification of counterfeit and/or substandard electronic devices, said apparatus comprising:
(a) an enclosure including a base and a peripheral wall having at least one of a pyramid shape, a cubical shape, a tapered conical shape and a tapered triangular shape and defining a hollow interior of said enclosure;
(b) a fixture mounted within said hollow interior, said fixture configured to receive one or more electronic devices there within, wherein said fixture provides a registration to be made at a precisely same location in said enclosure;
(c) at least one connection configured to apply at least one input to at least one pin on each of the one or more electronic devices mounted within said fixture, wherein said connection is applied to at least one of clock, power and ground;
(d) an antenna mounted on an interior surface of said peripheral wall or integrated into a thickness thereof, said antenna operable to capture an emission of a radiofrequency (RF) energy from the each of one or more electronic devices received within said fixture; and
(e) a sensor and controller assembly connected to said antenna and configured to process a signature of said captured emission and determine a condition of the each of the one or more electronic devices.

15. The apparatus of claim 14, wherein said sensor and controller assembly is operable to differentiate counterfeit and/or substandard electronic devices from authentic electronic devices.

16. The apparatus of claim 14, wherein said sensor and controller assembly is configured to differentiate responses from the one or more electronic devices to detect counterfeit and/or substandard electronic devices.

17. The apparatus of claim 14, wherein said sensor and controller assembly is configured to measure an unintended emission given off by at least one known authentic part and compare a signature of said unintended emission given off by at least one known authentic part to signatures from a lot of electronic devices to determine if said lot contains the counterfeit and/or the substandard electronic devices.

18. The apparatus of claim 14, wherein said sensor and controller assembly maintains a signature file and compares said signature to a lot of parts to determine if said lot contains counterfeit and/or substandard electronic devices.

19. An apparatus for detection and/or identification of counterfeit and/or substandard electronic devices, said apparatus comprising:
(a) an enclosure including a base and a peripheral wall having and defining a hollow interior of said enclosure;
(b) a fixture positioned within said hollow interior of said integrated antenna enclosure, said fixture configured to receive one or more electronic devices therewithin;
(c) two and only two connections configured to apply two and only two signals to two pins on each of the one or more electronic devices received within said fixture, wherein each of said two and only two signals is applied to a selectively distinct pin;
(d) means for modulating one or both signals from said two and only two signals;
(e) an antenna mounted on an interior surface of said peripheral wall or integrated into a thickness thereof, said antenna operable to capture an emission of a radiofrequency (RF) energy from the each of one or more electronic devices received within said fixture and having said modulated signals applied thereto; and (f) a sensor and controller assembly connected to said antenna and configured to process a signature of said captured emission and determine a condition of the each of the one or more electronic devices.

20. The apparatus of claim 19, wherein said two pins are signal and ground.

21. The apparatus of claim 20, further comprising a modulation means for modulating said power pin.

22. The apparatus of claim 20, further comprising a modulation means for modulating said ground pin.

23. The apparatus of claim 20, further comprising a modulation means for modulating said ground and power pins independently from each other.

24. An apparatus for detection and/or identification of counterfeit and/or substandard electronic devices, said apparatus comprising:
   (a) an enclosure;
   (b) a fixture mounted within a hollow interior of said enclosure, said fixture configured to receive one or more electronic devices therewithin;
   (c) one and only one connection configured to apply one and only one signal to one pin on each of the one or more electronic devices received within said fixture;
   (d) means for modulating said one and only one signal;
   (e) an antenna mounted on an interior surface of a peripheral wall of said enclosure or integrated into a thickness thereof, said antenna operable to capture an emission of a radiofrequency (RF) energy from the each of one or more electronic devices received within said fixture and having said modulated signals applied thereto; and
   (f) a sensor and controller assembly connected to said antenna and configured to process a signature of said captured emission and determine a condition of the each of the one or more electronic devices.

25. The apparatus of claim 24, wherein said fixture includes at least one of a coplanar waveguide, stripline, buried stripline, guard traces, ground plans and controlled impedance trace design features and is configured thereby to promote electromagnetic emissions from the one or more electronic devices under test while suppressing emissions from connections to the one or more electronic devices.

26. An apparatus for detecting anomalies in electronic devices comprising:
   (a) a means for modulating one or more inputs and/or one or more outputs of the electronic devices;
   (b) a means for detecting anomalies in a signature of electromagnetic emission given off by the electronic devices; and
   (c) an integrated antenna enclosure comprising a hollow interior, a drawer mounted for a movement, in a generally horizontal plane during use of said apparatus, to selectively allow access into said hollow interior and a fixture being mounted on an interior portion of said drawer, said fixture configured to receive the electronic devices therewithin, said integrated antenna enclosure coupled to said means for modulating one or more inputs and/or one or more outputs of the electronic devices and to said means for detecting said anomalies in a signature of electromagnetic emission given off by said electronic devices.

27. The apparatus of claim 26, wherein the electronic devices include at least one of microcontroller, microprocessor, Field Programmable Gate Array (FPGA), Digital Signal Processor (DSP), Complex Programmable Logic Device (CPLD), Analog to Digital Converter (ADC), Digital to Analog Converter (DAC), DC-DC converter, AC-AC converter, Integrated Circuits (IC) and memory devices.

28. The apparatus of claim 26, wherein said apparatus is configured to detect at least one of aging condition, a counterfeit condition, a degraded condition, a modified condition and a non-conforming condition of said electronic devices.

* * * * *